Dec. 13, 1966     A. G. BODINE, JR     3,291,227
OSCILLATOR MEANS FOR SONIC PILE DRIVERS
Filed Jan. 28, 1965     16 Sheets-Sheet 7

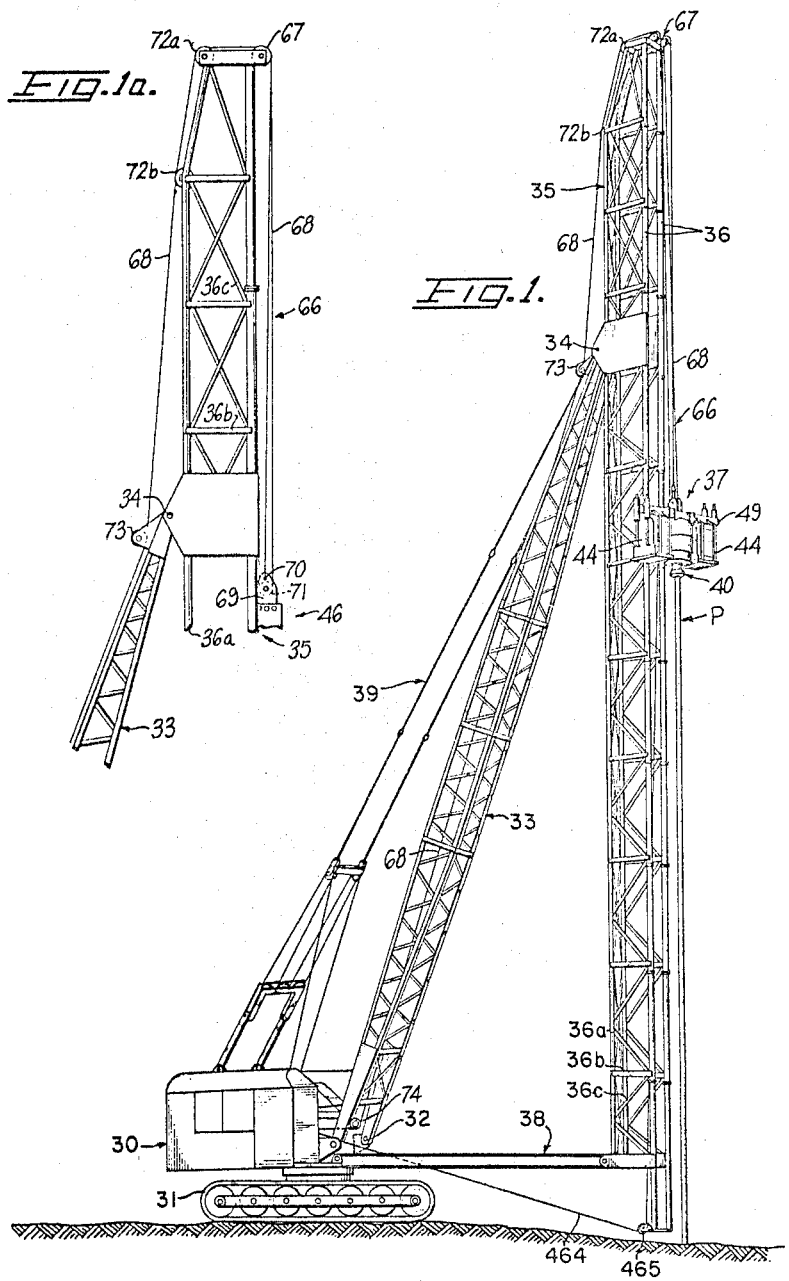

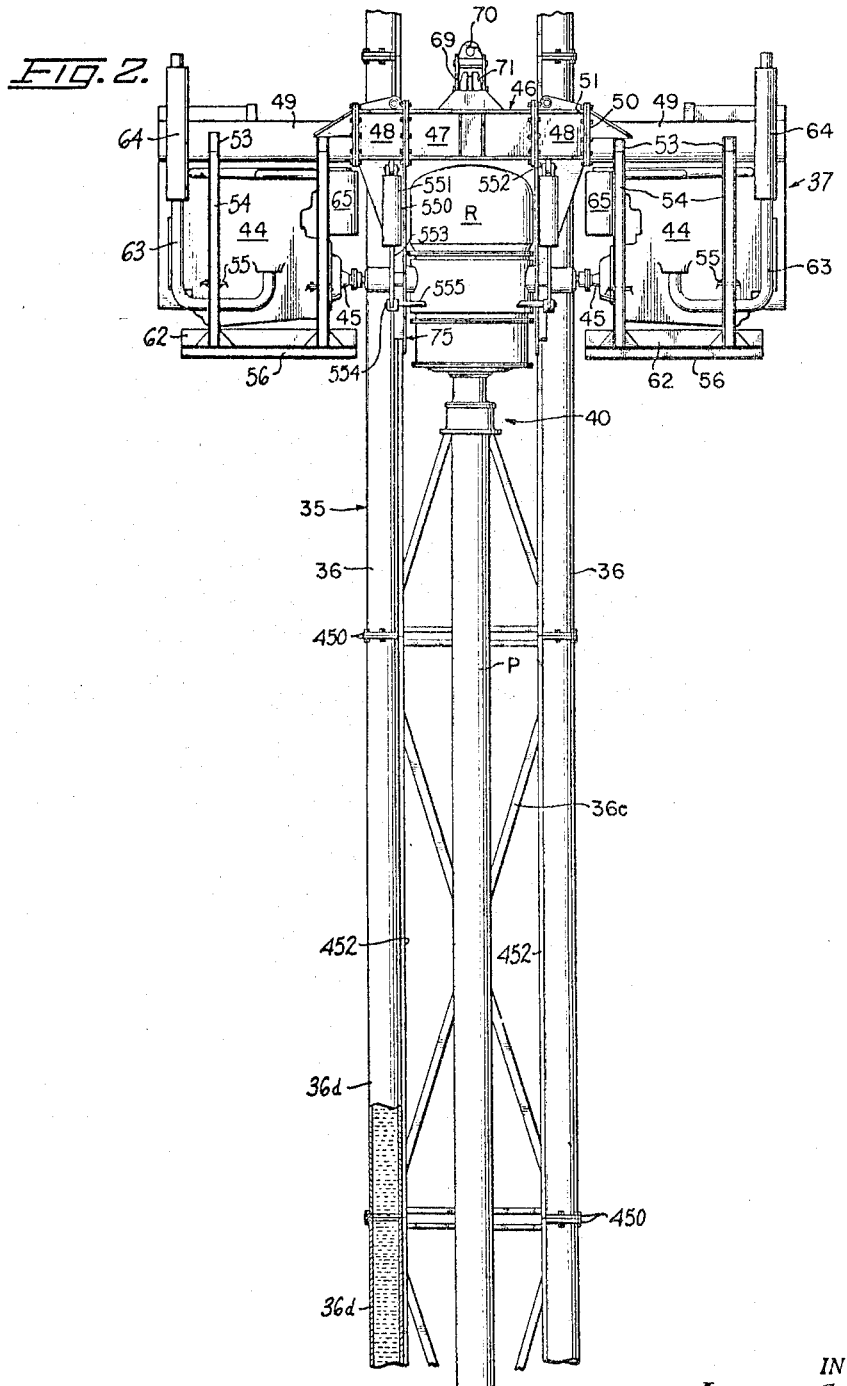

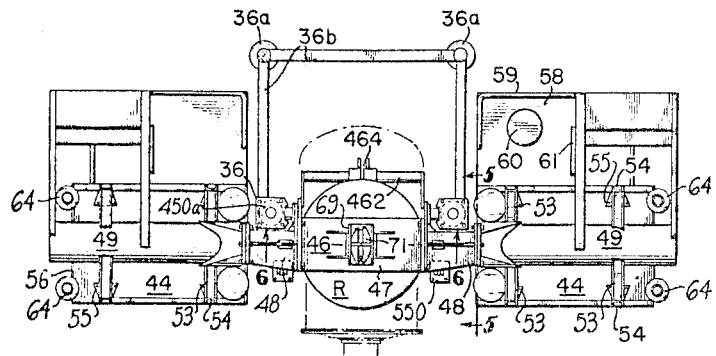
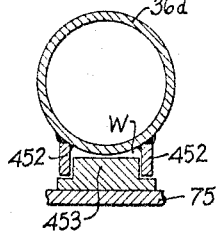
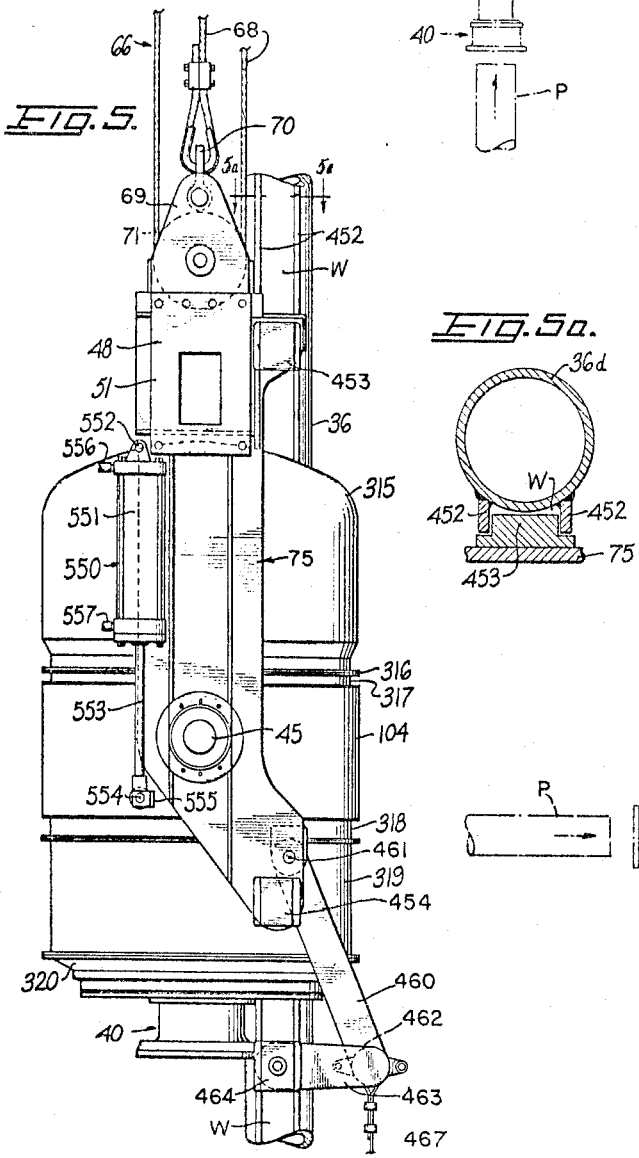
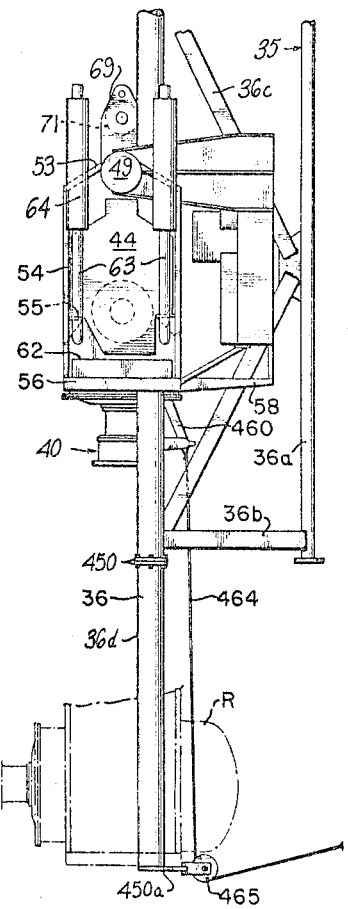

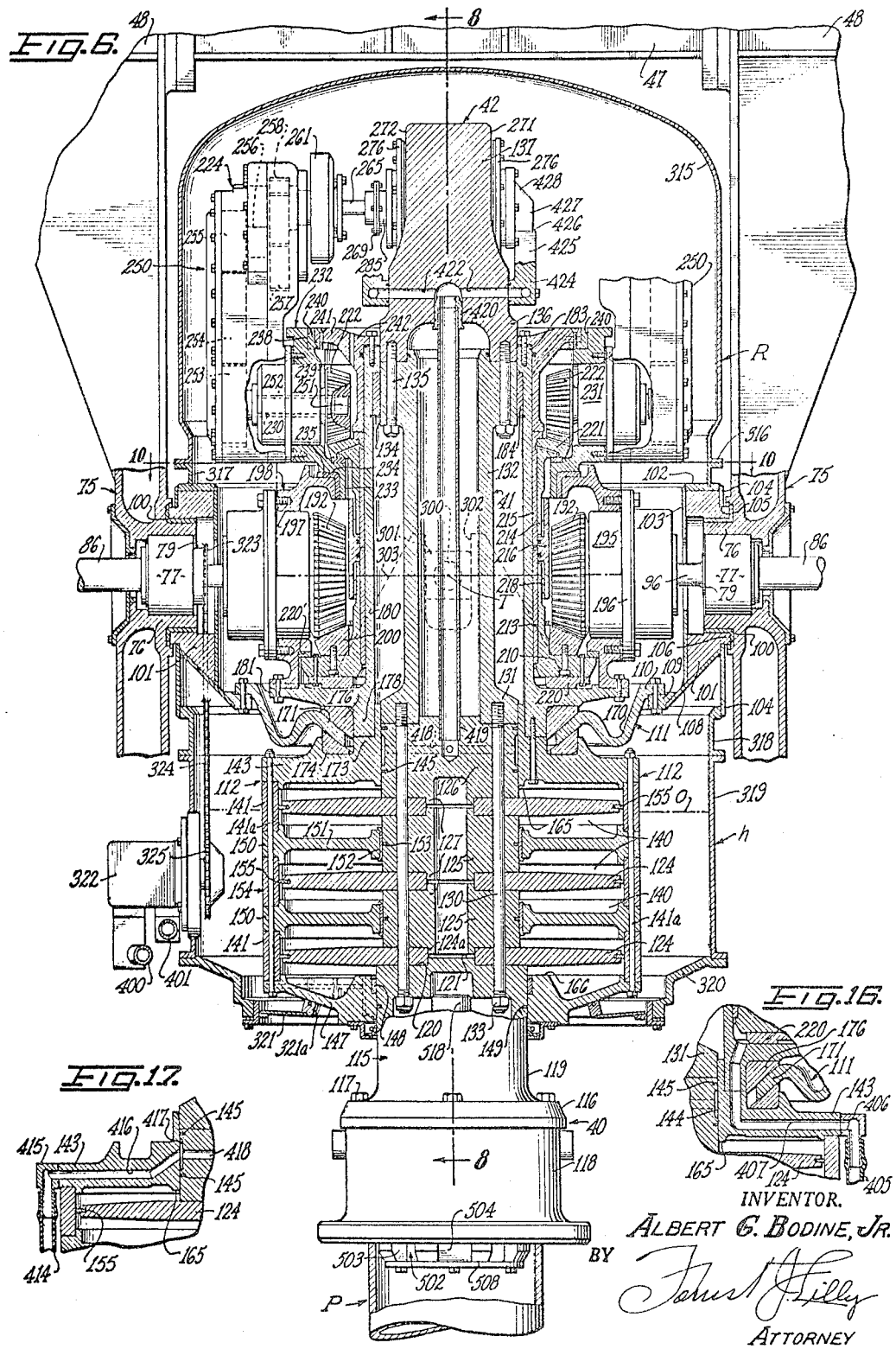

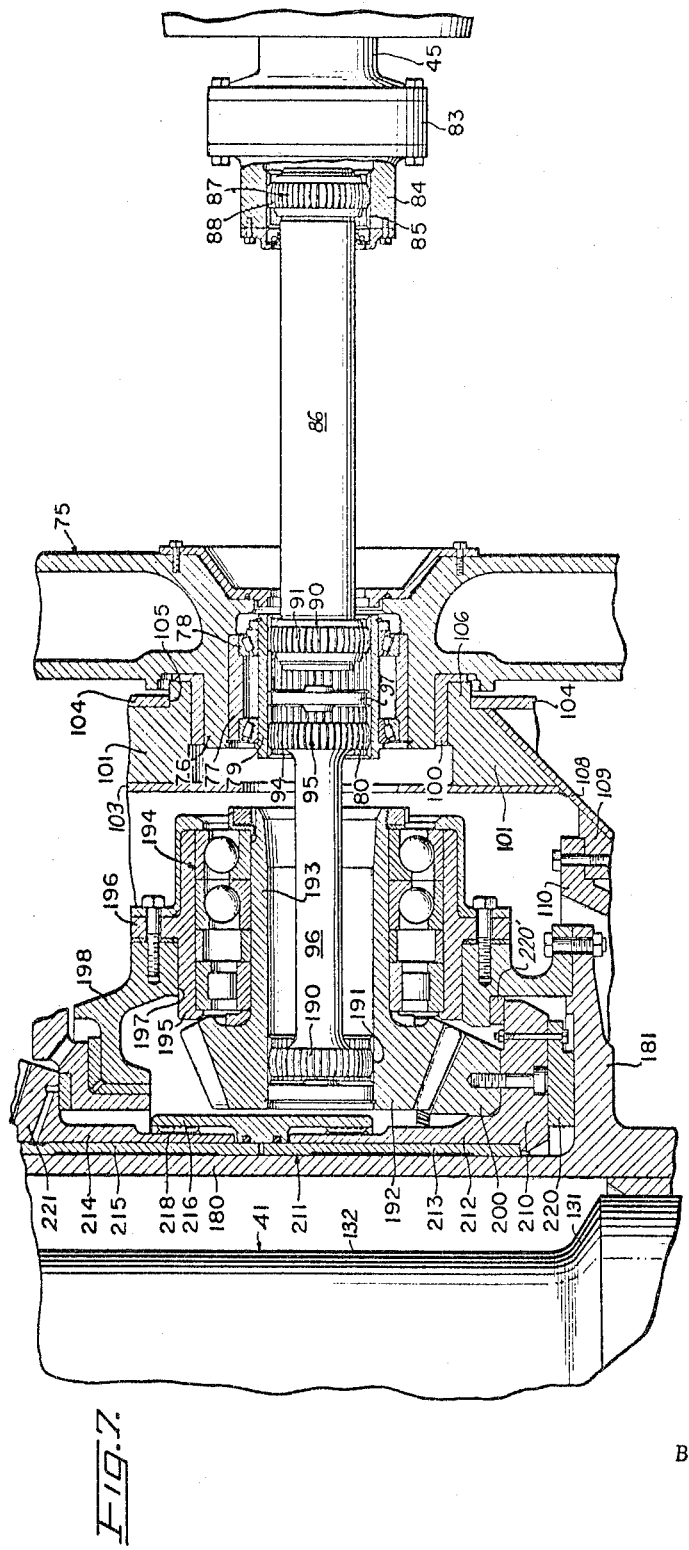

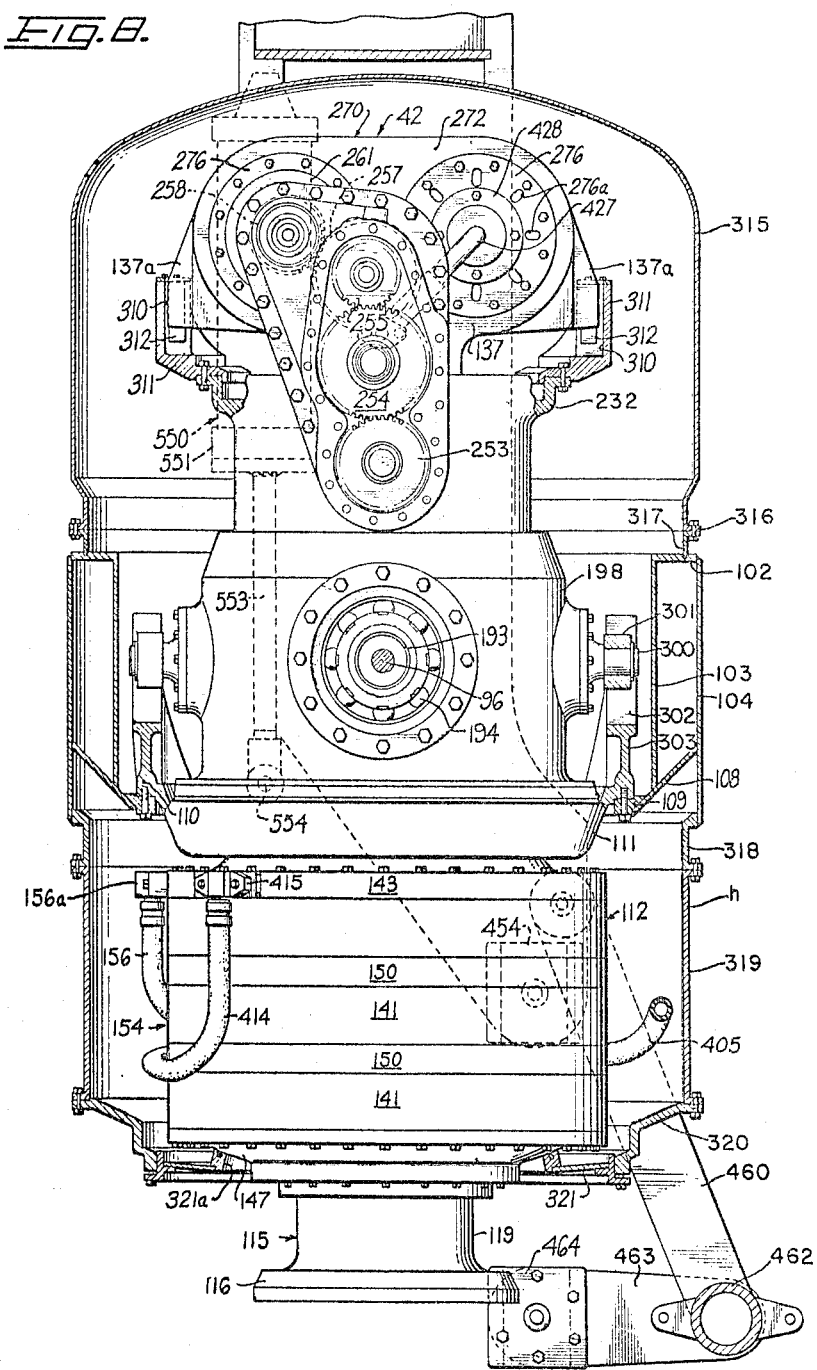

INVENTOR.
ALBERT G. BODINE, JR.
BY
ATTORNEY

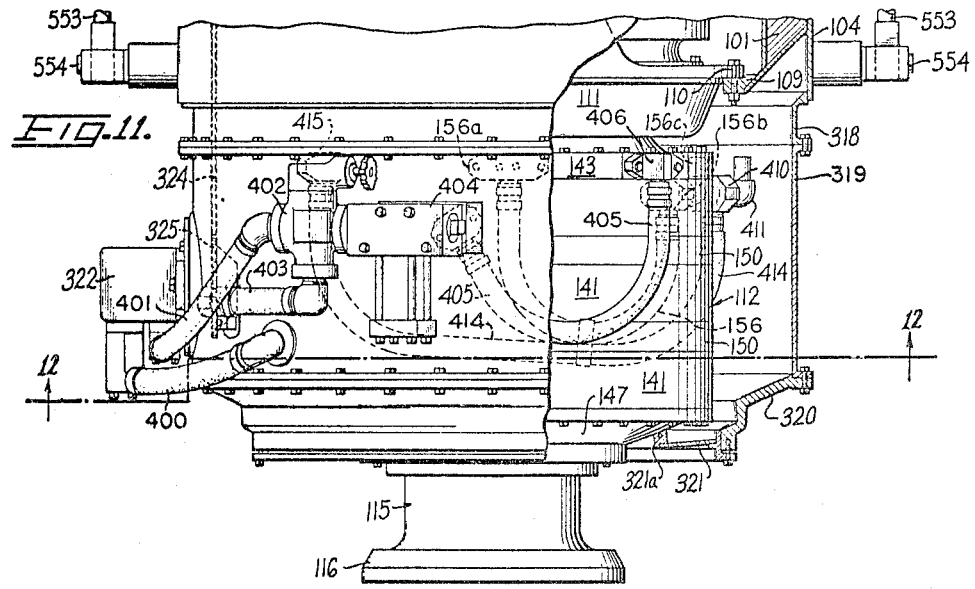

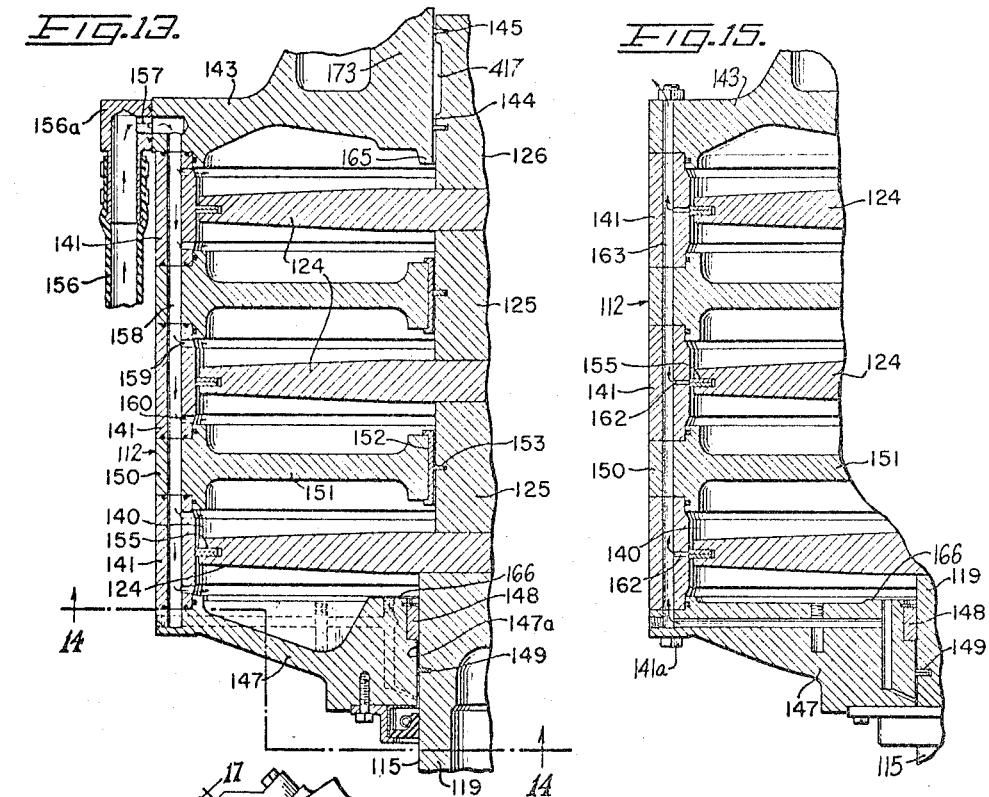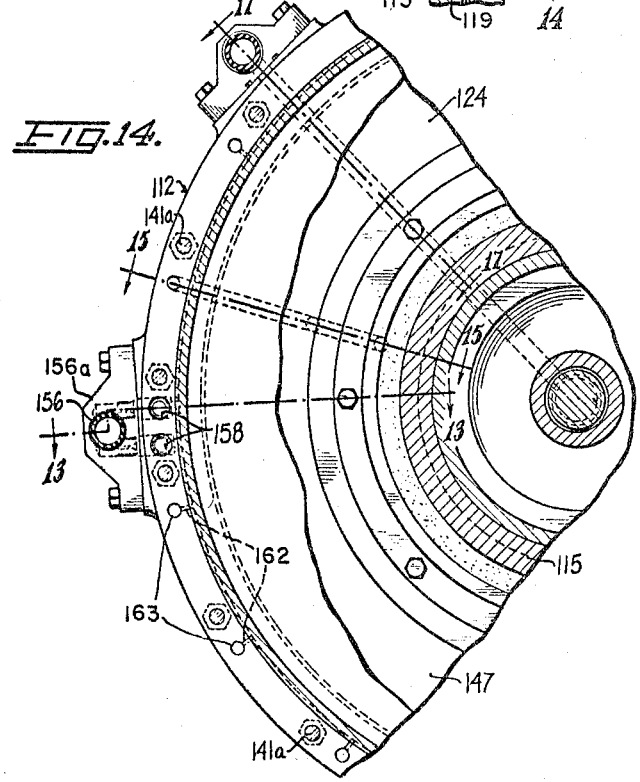

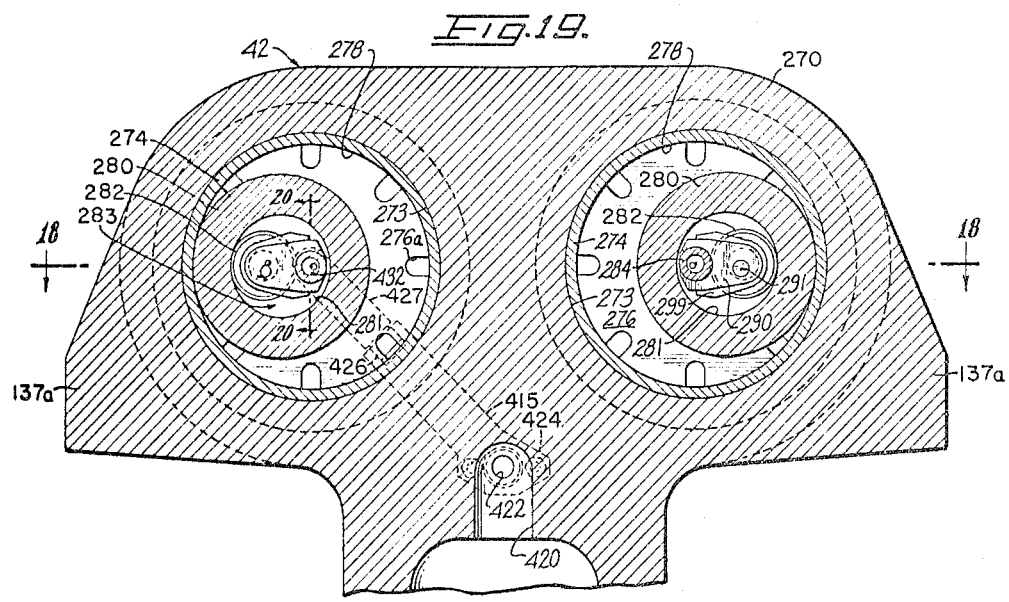
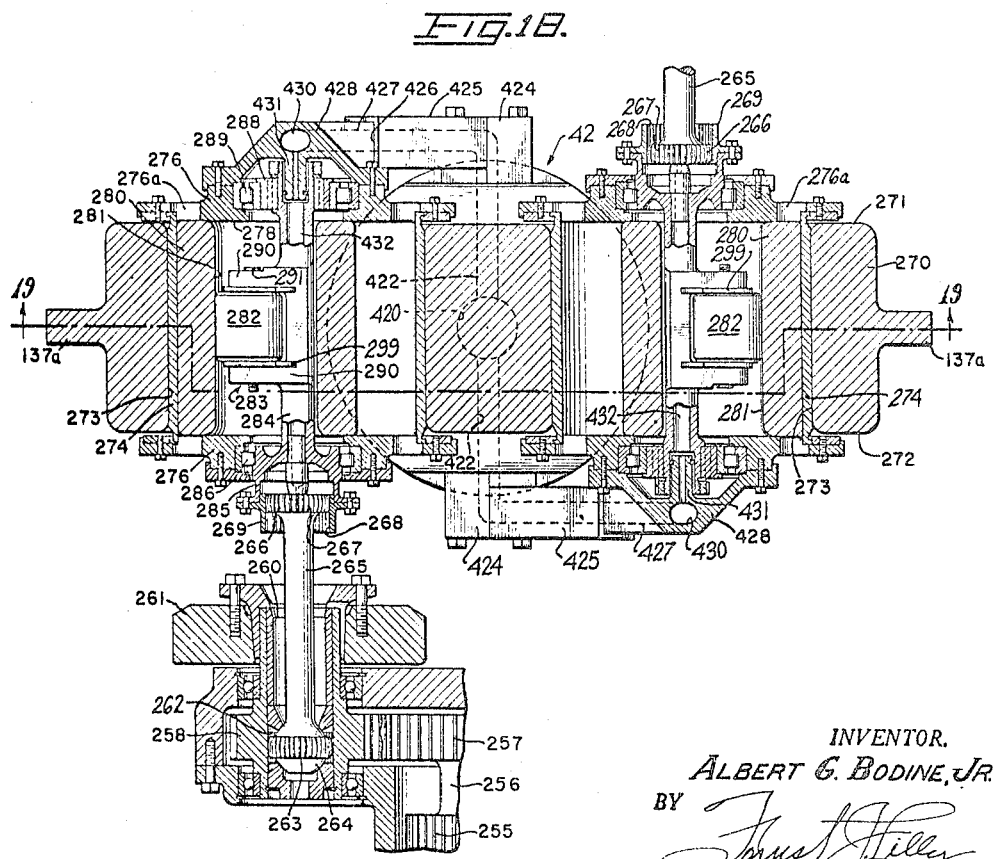

INVENTOR.
ALBERT G. BODINE, JR.
BY
ATTORNEY

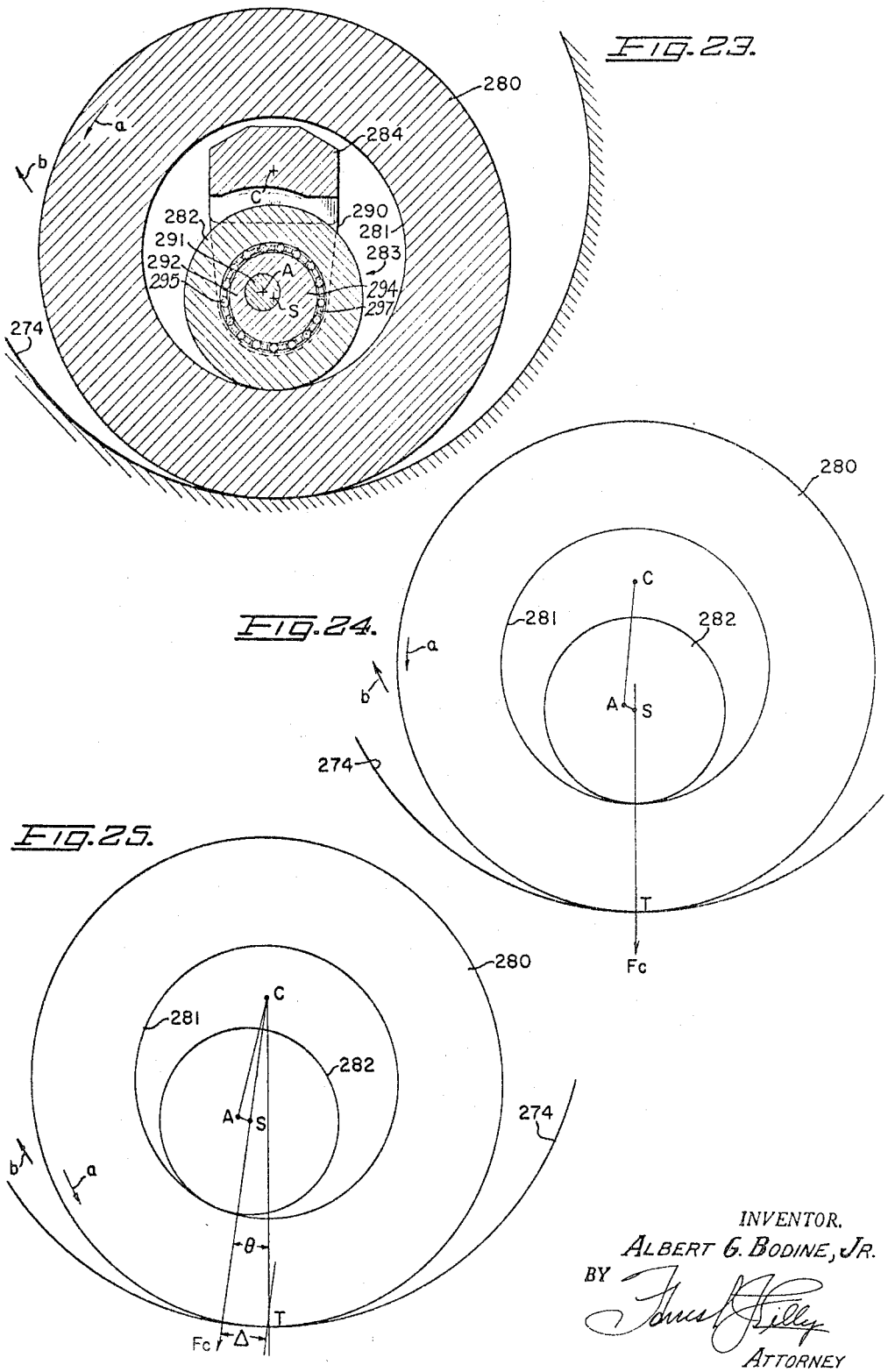

INVENTOR.
ALBERT G. BODINE, JR.
BY
ATTORNEY

Dec. 13, 1966   A. G. BODINE, JR   3,291,227
OSCILLATOR MEANS FOR SONIC PILE DRIVERS
Filed Jan. 28, 1965   16 Sheets-Sheet 15

INVENTOR.
ALBERT G. BODINE, JR.
BY
ATTORNEY

Dec. 13, 1966  A. G. BODINE, JR  3,291,227
OSCILLATOR MEANS FOR SONIC PILE DRIVERS
Filed Jan. 28, 1965  16 Sheets-Sheet 16
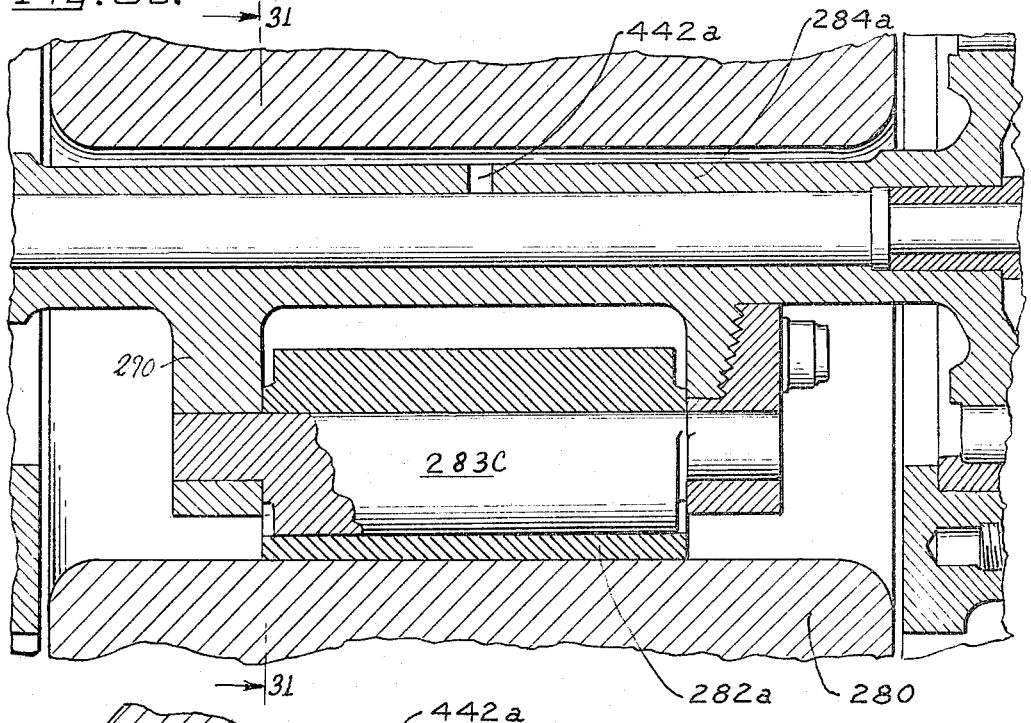
Fig. 30.
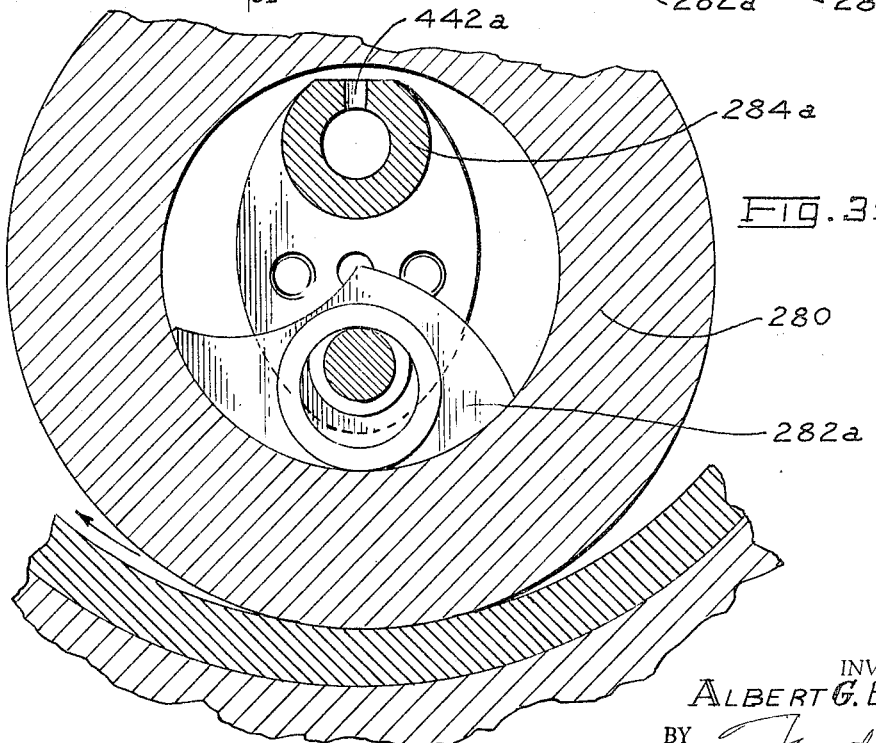
Fig. 31.
INVENTOR.
ALBERT G. BODINE, JR.
BY 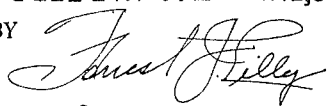
ATTORNEY.

United States Patent Office 3,291,227
Patented Dec. 13, 1966

3,291,227
OSCILLATOR MEANS FOR SONIC PILE DRIVERS
Albert G. Bodine, Jr., Los Angeles, Calif.
(7877 Woodley Ave., Van Nuys, Calif.)
Filed Jan. 28, 1965, Ser. No. 428,728
5 Claims. (Cl. 175—55)

This application is a continuation-in-part of my co-pending application Ser. No. 165,126, filed Jan. 9, 1962, entitled Sonic Pile Driver, now Patent No. 3,189,106.

This invention relates generally to sonic pile drivers, of the class disclosed in prior United States Patent No. 2,975,846, and which may be characterized generally as comprising means for setting up sonic waves in the pile while exerting a downward biasing force on the pile.

The acoustic theory underlying sonic pile drivers is set forth in said Patent No. 2,975,846, and need not be repeated herein in full detail. Briefly, a generator of sonic vibrations, i.e., a vibration generating oscillator, is acoustically coupled to the pile, with proper attention to adjustment of the output impedance of the oscillator to that of the pile with the pile in tight engagement with the earth, so as to set up longitudinal sonic wave action in the pile. The oscillator is operated, broadly speaking, so as to set up a resonant longitudinal standing wave in the pile. Assuming operation in the fundamental frequency range, the frequency for resonance may range, during operation, between $C/2L$ and $C/4L$, where $L$ is the equivalent length of the pile and acoustically coupled-in mass of the pile driver, and $C$ is the velocity of sound in the medium of the pile. For the longer length piles, operation may be at a harmonic of the fundamental frequency.

Sonic pile driving equipment of this class, embodying a number of features of the present invention, has demonstrated, in field tests, the ability to out-drive conventional steam hammer pile drivers by an average ratio of the order of 20 to 1, and in some instances has substantially exceeded that ratio.

Tests carried on to date with equipment of this type have demonstrated the need for powerful sonic drive, flexibility in the drive, accommodation to turning and/or tilting movements of the pile, and good compliant support for the motor means on the pile, whereby the motor means rests on the pile, but is virtually isolated from the sonic wave action or vibration set up in certain parts of the equipment and in the pile.

Objects of the invention include the provision of a sonic pile driver which is improved as regards power, flexibility and accommodation to movement of the pile during sonic wave driving, such as twisting or tilting.

A further object is to provide an improved sonic pile driver incorporating a complaint support for the motor means, whereby the motor means exerts weight on the pile, but is compliantly isolated from the sonic frequency vibration of the pile.

A further object is the provision of a flexible driver of novel nature between the motor means and the vibration generator or oscillator driven thereby, such that the oscillator is permitted a large amplitude of vibration, but only a small proportion of this vibration reaches back to the motor means.

A further object is an orbiting mass oscillator driven by a flexible driver and employing a massive roller with symmetrical internal drive force means.

A further object is such an internal drive means having a servo element in said massive roller.

A further object is the provision of a sonic pile driver having a novel means for picking up a pile from a horizontal position and hoisting it to a vertical driving position.

A further object is the provision of a novel and effective means for increasing the downward biasing force on the pile during driving.

Other objects will appear in the course of the ensuing description of a present illustrative embodiment of the invention, reference being had to the accompanying drawings, in which:

FIG. 1 is a somewhat diagrammatic perspective view of a sonic pile driving system in accordance with the invention;

FIG. 1a is an enlarged fragmentary view, in side elevation, of the upper end portion of the system of FIG. 1;

FIG. 2 is a front elevational view of the sonic pile driving machine of the invention, shown together with a portion of the leads on which the machine is vertically guided;

FIG. 3 is a plan view of the machine of FIG. 2, the oscillator and pile clamping means being shown in phantom lines in a tilted position to facilitate acceptance of the pile from an initial horizontal position at ground level;

FIG. 4 is a side elevational view of the machine of FIG. 3 showing the pile driving machine near the lower end of the leads, and showing, in phantom lines, the oscillator, pile clamp and other portions of the machine tilted into a horizontal position to facilitate acceptance of the pile from an initial horizontal position at ground level;

FIG. 5 is a section taken on line 5—5 of FIG. 3;

FIG. 5a is a detail section taken on line 5a—5a of FIG. 5;

FIG. 6 is a section taken on line 6—6 of FIG. 3;

FIG. 7 is an enlargement of a portion of FIG. 6, with parts broken away to show underlying portions in section;

FIG. 8 is a section taken on line 8—8 of FIG. 6, but with the oscillator and other interior parts in elevation;

FIG. 11 is an elevational view of the lower end portion of a tiltable housing of the apparatus, with parts broken away;

FIG. 12 is a section taken as indicated by line 12—12 of FIG. 11;

FIG. 13 is a section taken on broken line 13—13 of FIG. 14;

FIG. 14 is a section taken in accordance with broken line 14—14 of FIG. 13;

FIG. 15 is a section taken on line 15—15 of FIG. 14;

FIG. 16 is a detail section taken on line 16—16 of FIG. 12;

FIG. 17 is a detail section taken on line 17—17 of FIG. 14;

FIG. 18 is a section taken on line 18—18 of FIG. 19;

FIG. 19 is a section taken on line 19—19 of FIG. 18;

FIG. 23 is a section on line 23—23 of FIG. 20;

FIGS. 24 and 25 are diagrammatic views illustrating the performance of the vibration generator of FIGS. 20–23;

FIGS. 28–31 are sectional views illustrating alternative forms of the vibration generator elements shown in FIGS. 20 and 21.

Figure 9:
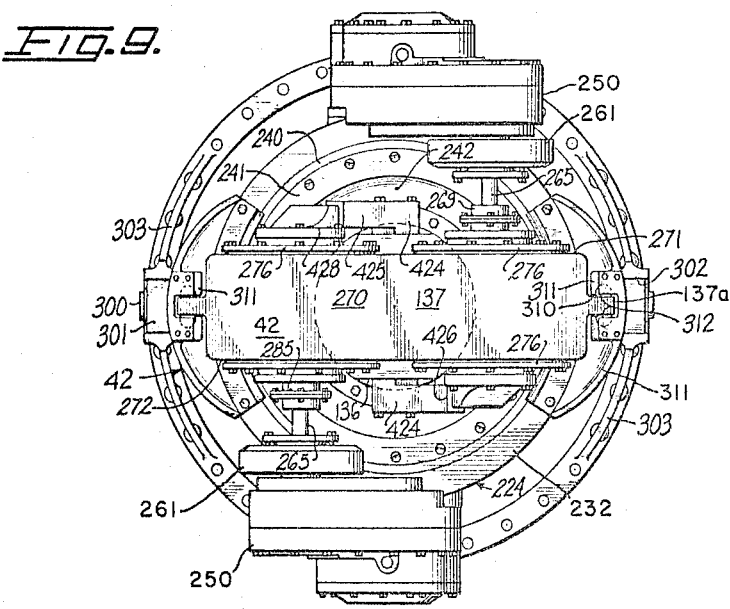
FIG. 9 is a vertical plan view of the parts inside the exterior casing of FIG. 8.

The invention makes use of certain pile driver transport and handling equipment now conventional in hammer-type pile drivers. Thus, as shown in FIG. 1, a vehicle 30 equipped with crawlers 31 pivotally supports, at 32, a boom 33, the upper end of which in turn pivotally supports, at 34, the usual "leads" 35 comprising a box-frame beam structure including a pair of tublar vertical front legs 36 on and between which a framework for the sonic driving machine 37 is vertically guided, much as in the conventional hammer. The sonic driving machine 37 delivers to the pile P a cyclic force wave characterized by a succession of high amplitude force impulses at a resonant standing wave frequency of the pile, as will be described in more particular hereinafter. A so-called "spotter," comprising a telescopic beam structure 38, adjustable in length, is connected between the vehicle 30 and the lower end of the leads 35, and conventional cable gear 39 is used to raise and lower the boom, all as is fully understood in the pile driving art, and will require no further description herein. The so-called leads 35 comprise, in addition to the aforementioned vertical front legs 36, a pair of rear legs 36a, and suitable horizontal bracing 36b and diagonal bracing 36c as indicated. The sonic machine is suspended from the upper end of the leads by a block and tackle system as well be described.

While the present pile driver is capable of or adaptable to the driving of various types of pile, such as tubular, open or closed bottom, tubular corrugated, inside or outside mandrel driven, H-section, etc., the invention is here illustrated as driving a tublar pile P (see FIG. 2). The upper end of this pile is rigidly clamped by a hydraulically actuated clamp or coupling means generally designated by the numeral 40, and described in detail hereinafter. As shown best in FIG. 6, a column generally designated by numeral 41, and made up of later described components, extends upwardly from clamp means 40 and carries at its top the vibration generator or oscillator 42. In operation, the body of this oscillator delivers to the upper end of column 41 a cyclic vertically oriented alternating force of large magnitude or impulse, and this cyclic force is transmitted through column 41 and clamp means 40 to the upper end of the pile. The frequency of this cyclic force is made to be in the range of a resonant standing wave frequency of the pile, in general as disclosed in the aforesaid Patent No. 2,975,846.

This sonic pile driving machine of the invention, in its present illustrative form, has two separate motor means for driving the oscillator 42, comprising, perferably, and in this instance, two internal combustion engines 44 (FIGS. 2, 3 and 4), disposed on opposite sides of the leads, in end-to-end opposition, with their drive shafts 45 in axial alignment. The common axis of the drive shafts intersects the vertical axis of the pile P and the column 41.

Extending horizontally over and longitudinally of the two engines is a horizontal support beam structure 46 (FIGS. 2 and 3) comprised of a center beam 47, two short frame beams 48 bolted to and extending outwardly from the ends of center beam 47, and two tubular engine support beams 49 extending outward from frame beams 48 and overlying the two engines. The two tubular beams 49 have braced flanges 50 suitably secured to mating flanges 51 on the frame beams 48. Tubular beams 49 are closed at the ends and serve as air receivers, for a purpose to be mentioned hereinafter. A standard compressor, not shown, maintains these receivers filled with air under necessary compression. Extending laterally and downwardy from the tubular beams 48 are engine support framing means including lateral members 53 and vertical channel members 54 carrying engine support brackets 55 (FIGS. 3, 4 and 5). Connected to the lower ends of members 54 are lower horizontal frame members 56. Platforms 58 extend rearwardly from the rearward frame members 56 (FIGS. 3 and 4) and on at least one of these platforms is erected a hand rail 59 and a seat 60 for an operator. An instrument panel, in convenient reach of the operator's position, is indicated at 61.

Fuel tanks for the engines are indicated at 62, supported below the engines by frame members 56, and the engines are shown with exhaust pipes 63, mufflers 64, and air cleaners 65 (FIG. 2).

The entire sonic machine may be hoisted or lowered by means of block and tackle gear 66 including double sheaves 67 in the top of the leads, a cable 68, and a block 69 having an eye 70 for connection of one end of the cable 68, and a sheave 71, mounted at the center of beam 46 (FIGS. 1–5). The cable 63 goes from eye 70 over one sheave 67 at the top of the leads, then down and around sheave 71, then up and over the second sheave 67, then down the back of the leads over guide sheaves 72a and 72b, under a sheave 73 mounted on the leads adjacent the upper end of boom 33, under another sheave 74 near the lower end of the boom, and thence to a power winch (not shown) within the vehicle 30. During hoisting or lowering movement of the sonic machine by this cable system, the machine is guided by the tubular members of the leads 36, as later described.

The frame beams 48 have depending double-walled legs 75 (FIGS. 5, 6 and 7) formed, in axial alignment with the engine drive shafts, with inwardly projecting hubs 76. These hubs 76 receive bearing sleeves 77 containing roller bearings 78 for drive sleeves 79 formed with internal splines 80.

As shown best in FIG. 7, each of the aforementioned engine shafts 45 is coupled through coupling 83 to a cup 84 containing internal splines 85, and a drive shaft 86 has on one end a head 87 received inside cup 84 and formed with arcuate splines 88 meshing with spline 85, and has on the other end a head 90 received inside the corresponding end portion of sleeve 79 and formed with arcuate splines 91 meshing with splines 80. The arcuate splines on heads 87 and 90 permit the shaft 86 to move angularly through a limited extent while driving the sleeve 79 from the engine shaft 46. Received in the opposite end portion of sleeve 79 is a head 94, provided with arcuate splines 95 meshing with splines 80, and formed on the end of a shaft 96. The other end of this shaft 96 drives certain gears leading to the oscillator, as will later be explained. An intermediate partition 97 in sleeve 79, engageable by heads 91 and 95, limits endwise movement of the shafts 86 and 96 inwardly into sleeve 79.

The two frame hubs 76 (FIG. 6) form axially aligned trunnions, on which the oscillator and certain associated gearing and other components of the mechanism are pivotally mounted. Bearing bushings 100 (FIG. 7) surround trunnions 76, and rotatable on bushings 100 are frame members or collars 101 which are disposed about the trunnions, and to which are welded a top frame ring 102. An inner cylindrical wall 103 is welded to the inner edge of ring 102 and to members 101, and an outer cylindrical wall 104 is welded to the outer edge of ring 102, just outside members 101, and being apertured, as at 105 (FIG. 7), to receive outwardly projecting annular portions 106 of the members 101.

A heavy frusto-conical plate 108 is welded to walls 103 and 104, just below collars 101, and carries, at its lower, inner edge, a mounting ring 109 engaged by a peripheral flange 110 on the rim of a heavy support plate 111, to be described in more detail hereinafter, but which may be stated at this point to be supported compliantly, in the vertical direction, by the upper end of an air spring generally designated at 112. It may also be stated at this point that the weight of the two engines is imposed through the beam 46, frame legs 75, trunnions 76, frame collars 101, cylindrical walls 103 and 104, frusto-conical plate 108, and plate 111, onto the upper end of the air spring. In fact, as will appear from what follows, the weight of the entire machine, excepting for the oscillator 42, its supporting column 41, the later described air spring pistons, and the hydraulic pile clamp 40, is transferred through the plate 111 to the upper end of the air spring. The air under compression in this air spring 112 transfers this entire load compliantly to the aforementioned column 41 mounted on the pile, and thus to the pile, as presently to be described. It will further be seen that the beam structure 46, engine support means carried directly thereby, and the beam arms 75, comprise a main framework adapted for vertical guidance by the leads; while trunnioned to the arms 75 of this framework is a frame means 101, 102, 103, 104, 108 and 111 imposing the load of this structure on the top of the air spring.

The air spring 112, in a present illustrative form, is made up as follows (FIGS. 6, 13, 14 and 15): The hydraulic clamp 40 for the pile includes an upper inverted cup 115 (FIGS. 6 and 26) having a marginal flange 116 secured, as by screws 117, to the bottom of a lower inverted clamp cup 118, into which the upper end of the pile is received and clamped, as later described. The upper cup 115 has a cylindrical side wall 119, and a flat top 120 provided with a central boss 121. Mounted on the top 120 of cup 115 is the lowermost of a plurality of circular plates 124, here three in number, serving as pistons of the air spring. The two plates 124 above the lowermost one are separated from the latter and from each other by thick spacer washers 125, and a cylindrical head 126, of the same diameter as the washers, seats on the uppermost plate 124. The plates 124 have central positioning apertures 124a receiving the boss 121 on cup 115, and receiving similar bosses 127 formed on the washers 125 and head 126. The cup 115, spacer washers 125 and head 126 are connected by tie rods 130, the upper ends of which are threaded into a flange 131 on the lower end of a tubular stem 132 forming an upper portion of the column 41, and the lower end of which are threaded to receive nuts 133, as shown. An enlarged cylindrical head 134 at the upper end of stem 132 is secured, as by studs 135, to the cylindrical base part 136 of the oscillator body 137. The cup 115, plates 124, washers 125, heads 126, and stem 132, comprise the aforementioned column 41 by which the oscillator body is supported on the upper end of the pile.

The piston plates 124 are positioned in chambers 140 whose side walls are defined by cylindric rings 141. Engaging and sealed to the uppermost ring 141 is an air spring cover plate 143, bearing the down load of the plate 111, and formed with a central bore 144 (FIG. 13) which receives, with a small clearance, the head member 126 of column 41. Vertically spaced piston rings 145 are used around the head member 126 to afford a pressure-tight seal, as shown.

At the bottom of the air spring assembly is a bottom cover plate 147 (FIG. 13), engaging the lower end of the lowermost ring 141, and bore, as at 147a, to receive, with clearance, the cylindrical side wall 117 of cup 115. The plate 147 is counterbored to receive a bronze bearing bushing 148 for the clamp cup wall 119, and piston rings 149 seal the cover plate 147 to said wall 119.

Between the rings 141 are spacer rings 150 formed with partition walls 151 which carry bushings 152 (FIG. 13) fitting spacer washers 125 with small annular clearance, pressure-tight seals being provided therebetween by means of piston rings 153. The assembly of rings 141 and 150 and upper and lower cover plates 143 and 147, is secured by long bolts 141a, making up air spring housing 154. The peripheries of the piston plates 124 carry piston rings 155 which afford pressure seals with the cylindric inside surfaces of the ring 141.

Air under pressure is supplied to air spring chambers 140 as shown best in FIG. 13. The pressurized air is coneyed via a hose 156 to a fitting 156a on the rim of cover plate 143. Hose 156 leads from a fitting 156b on the inside of a later described housing wall, which is fed through connector 156c (FIGS. 11 and 12) on the outside of said wall from a hose, not illustrated, but which will be understood to lead from any suitable source of air under pressure, for example, one of the pressure reservoirs 49. The air entering fitting 156a passes through a pair of metering orifices 157 to passages 158 extending vertically through rings 141 and 150. Upper and lower ports 159 and 160 in rings 141 provide communication between passages 158 and the chamber spaces above and below the pistons 124, so that air under pressure is delivered to both of said chamber spaces. The piston rings 155 in the edges of pistons 124 control orifices 162 (FIG. 15) in the rings 141 leading to vertical air discharge passages 163. As seen in FIG. 14, there are a number of the vertical discharge passages 163, and a corresponding plurality of the orifices 162. In the midpositions of the pistons, the orifices 162 are closed by the piston rings 155. Whenever the downward loading imposed on the air spring housing 154 exceeds a predetermined value, the air spring housing lowers relative to the pistons 124, so that orifices 162 communicate wholly or partially with the chamber spaces below the pistons. A quantity of pressure air is thus discharged from below the pistons, so that there is a pressure differential across each piston in the downward direction. It will be seen that this pressure differential is such that an upward force is exerted on the air spring housing, so that the latter then tends to rise. The system seeks and tends towards a condition characterized by bodies of air under compression above and below the several pistons, and with sufficient continuous or periodic discharge of air below the pistons to afford regulated air pressures and a regulated pressure differential which furnishes air spring support for the air spring housing and parts resting thereon. During pile driving, the pistons 124 oscillate vertically, while the air cushions between the plates and the air spring housing virtually isolate the latter from such oscillation. At the same time, the parts resting on the air spring housing are vertically supported by the air under compression in the air spring, and whatever minor vertical vibration, if any, that may occur in the air spring housing is accommodated by the compressed air in the air spring.

It will be seen that the air spring cover has on its underside an annular abutment 165 for the uppermost piston plate 124, normally spaced thereabove, but furnishing a stop shoulder engageable against the uppermost plate 124 in event of loss of pressure in the chambers 140 above the plates 124. Similarly, the lower air spring cover 147 has an annular abutment 166, which is engageable against the lowermost plate 124 in event of an upward pull being taken on the air spring housing (under conditions to be described later) in event of loss of pressure in the chambers 140 below the plates 124. In normal operation, the piston plates 124 have a vibratory travel range which terminates short of the abutment shoulders 165 and 166.

Referring again to the supporting plate 111, and to FIG. 6, the periphery of said plate, as explained above, has a peripheral flange or mounting rim portion 110. Inside said rim portion, the plate has a channel portion 170 (the reason for the shape of which will appear hereinafter) inside of which is a centrally apertured dished or arcuate portion 171, defined by arcs struck about a center point T (FIG. 6) which is at the intersection of the axes of the engine shafts with the vertical axis of the column 41 and the pile. This arcuate portion 171 surrounds the hub portion 173 on the top of cover plate 143, there being a substantial annular clearance between these parts, as shown. A bearing ring 174 seated in a pocket in the top of plate 143 has a concave arcuate upper face mating the convex arcuate lower face of plate portion 171. A bearing ring 176 has a convex arcuate lower face mating the concave upper face of plate portion 171. This bearing ring 176 fits onto the tubular lower end portion 178 of a sleeve 180, said tubular portion 178 engaging an annular seat on air spring cover 143 and being secured thereto, as shown best in FIG. 6. The arcuate portion 171 of plate 111 has a free-sliding fit between the bearing rings 174 and 176.

Sleeve 180, has, just above tubular portion 178, an annular flange 181, the underside of which engages bearing ring 176, and which in turn supports certain parts of the mechanism, as will presently appear. The sleeve 180 rises to a level just above the lower end of the cylindrical base part 136 of the oscillator body or housing, having at its uppermost end an internal shoulder 183 which fits oscillator base part 136 and cylindrical head 134 of stem 132 with clearance, and under which is confined a bronze bearing bushing 184 for said cylindrical head 134.

Referring again to FIGS. 6 and 7, the aforementioned shafts 96, understood to be driven in opposite directions on their common axis from the two engines, have on their ends nearest the pile axis heads 190 formed with arcuate splines 191 which mesh with internal splines inside the bores of bevel gears 192. Each of these gears 192 has a sleeve portion 193 turning in a bearing 194, the outer cylindrical case 195 of which has an intermediate mounting flange 196. The two bearing cases 195 are received in cylindrical openings 197 formed in opposite sides of a frame ring 198 supported on and secured to a peripheral portion of the aforementioned flange 181, as clearly shown in FIGS. 6 and 7. The bearing mounting flanges 196 engage the frame ring 198 around the openings 197, and are secured thereto as shown.

Oppositely rotating bevel gears 192 mesh with a ring gear 200 which surrounds sleeve 180, with annular clearance, and which is secured to an annular flange 210 on the lower end of a telescopic drive sleeve assembly 211 (FIG. 7) surrounding and relatively rotatable about the aforementioned sleeve 180. Preferably, the sleeve assembly 211 includes a lower sleeve portion 212 reaching upwardly from flange 210, and carrying a bronze bushing 213 rotatable on sleeve 180, an opposed upper sleeve portion 214 spaced above sleeve portion 212, and carrying a bronze bushing 215 also rotatable on sleeve 180, and an intermediate interconnecting sleeve 216 having portions overlapping said upper and lower sleeve portions 212 and 214, and drivingly connected therewith by splines 218.

The flange 210 at the bottom of the drive sleeve assembly 211 has secured to its bottom a bronze bearing ring 220, which bears against and turns on the flange 181. The upper side of this flange 210 engages a bronze bearing ring 220' supported by frame ring 198 (FIG. 6). The upper end of the upper sleeve portion 214 of sleeve assembly 211 has integrally formed therewith a ring gear 221, meshing with and driving, in opposite directions on their common axis, two bevel gears 222 of a turret 224 through which the oscillator 42 is driven. The telescopic feature of sleeve assembly 211 is for the accommodation of longitudinal expansion or contraction owing to temperature changes, and is such as to assure that the working parts at both the upper and lower ends of this sleeve assembly maintain proper positions with reference to bearing surfaces, gears, etc.

The aforementioned bevel gears 222 are on gear sleeves 230 (FIG. 6) journalled in suitable bearings in bearing housings 231 which are secured in opposite sides of a turret frame ring 232, and the latter has at the bottom a tubular extension 233 and a downwardly presented bearing face 234 outside thereof which engage a bronze bearing ring 235 seated in the previously described frame ring 198. Turret frame ring 232 is thus rotatable on frame ring 198. Turret frame ring 232 also has, at the top, an internal cylindrical bearing surface 238 and an upwardly facing bearing surface 239 which engage a bronze bearing ring 240 secured to a flange 241 on the upper end of a cap member 242 secured over and to the upper end of sleeve 180.

Secured to turret frame ring 232, at diametrically opposite locations thereon, are gear housing assemblies 250, accommodating certain oscillator gears and bearings therefor as will now be described. Each of the bevel gears 222 is internally splined, as at 251, to a shaft 252 which drives a spur gear 253 suitably journalled in the associated housing assembly 250. The gear 253 drives a spur gear 254, which in turn drives a gear 255, and the latter is on a shaft 256 carrying a larger gear 257 which meshes with and drives a gear 258 (see FIG. 18). Gear 258 is on a gear sleeve 260 carrying a flywheel 261, and has internal splines 262 meshing with arcuate splines 263 on a spheric head 264 at one end of a drive shaft 265, the other end of which has a head 266 carrying arcuate splines 267 which mesh with splines 268 inside a coupling 269 to one side of oscillator 42. As will appear from FIGS. 6 and 9, the two gear housing assemblies 250 are so arranged that the two drive shafts 265 are parallel to one another, are on opposite sides of the oscillator 42, and are aligned with opposite halves of the latter. Also, the gear trains are so arranged that the two shafts 265 rotate in opposite directions, as will be evident.

The oscillator contains means driven by the two shafts 265 by which the massive oscillator body 137 is set into relatively low amplitude but high force vertical vibration, and this means may, as in many known applications in the prior art, comprise two unbalanced or "orbital" rotors, one rotated by each of the two oppositely rotating shafts, with the rotors journalled in the body 137, and with their unbalanced masses so synchronized as to move vertically in unison, and laterally toward and from one another in unison. In such a device, the two unbalanced rotors, with their centers of gravity describing orbital paths, generate reaction forces on the body 137 which are additive in the vertical direction, but which cancel one another in the lateral direction. Powerful vertically oriented vibration forces are thereby exerted on the device on which the generator body 137 is mounted.

However, I have here shown a preferred, improved oscillator having a number of functional advantages, which are unique and of special efficacy in a powerful sonic machine of the present character, and which has exhibited outstanding performance.

The oscillator body 137 is horizontally elongated, forming a sort of massive T-head 270 on the top of its cylindrical base part 136. This T-head has flat side faces 271 and 272, and contains parallel transverse bores 273 extending between these faces, one in each half of the T-head, and the two bores being aligned with the two aforementioned oscillator drive shafts 265. These bores 273 are lined with tightly fitted hardened steel bushings 274.

Clamped to the projecting end portions of the bushings 274 are end plates 276, the inside surfaces of which define, with bushings 274, two cylindrical chambers 278 for two relatively massive hollow cylindrical rollers or rings 280 having axial bores 281. With reference to FIGS. 18 and 19, the rings 280 are caused to roll around the inside surfaces of the bushings 273 in opposite directions by means of servo-rollers 282 which are inside of the bores of the rings 280, and which are driven in opposite direction in orbital paths by crank mechanisms 283 from oppositely rotating oscillator drive shafts 265, as shown and diagrammed in FIGS. 20–25 in addition to FIGS. 18 and 19. Note that FIGS. 20–25 show the rings 280 and arms of the crank mechanisms in different positions from those of FIGS. 18 and 19, i.e., at the bottoms of their paths of travel. The rings 280, in rolling around the bushings in the oscillator body 137, exert centrifugal forces against the latter, and the servo-rollers and their driving crank mechanisms are initially so synchronized that the rolling rings move vertically in unison, and toward and from one another in unison, so that vertical forces exerted thereby on the oscillator body 137 are additive, while lateral forces are equal and opposed, and therefore cancel.

A crankshaft 284 extending through the bore 281 in ring 280 has at its driven end an enlarged head 285 journalled in suitable bearings 286 supported by the associated end plate 276 and flange-connected to the aforementioned coupling 269 as best shown in FIG. 18. At the other end, the crankshaft has assembled therewith a disk or washer 288 supported within bearing 289 carried by the corresponding end plate 276. The latter are ported, as at 276a, to permit escape of latter mentioned lubricant mist.

The crankshaft 284 has a pair of cheek plates 290 which mount a cross-pin 291, and on this pin, between the two cheek plates, is an eccentric bushing 292 having short tubular end portions 293 concentric with pin 291, but an eccentric central main portion 294. Surrounding eccentric portions 294, and concentric therewith, is the aforementioned servo-roller 282, needle bearings 295 being provided therebetween as indicated. The needle bearings are spaced by spacer rings 296 and 297, fitted into the bore 298 of roller 282.

Spacer plates 299 are provided between the ends of the roller 282 and the crankshaft cheek plates, and are formed with notches 299a receiving the crankshaft (FIG. 21) to prevent them from rotating relative to the cheek plates.

The operation of the servo-roller may be understood best from FIG. 23, and from FIGS. 24 and 25 which are analytic diagrams of the mechanism. Consider first the ring 280 in the bushing 274 in oscillator body 270, and assume it to be in its lowermost position, as in FIG. 23. The problem is to roll it around the inside of bushing 274, with the point of contact between bushing and ring 280 progressing clockwise around the bushing. It will be seen that the ring, in this motion, must actually roll in a counterclockwise direction on its own center, as indicated by the arrow a. At the same time, the ring moves bodily in a circular orbit in a clockwise direction, as indicated by the arrow b. It will further be seen that the ring 280, rolling without substantial slippage in the surface of the bushing, makes a number of orbital trips per second around the bushing track which is substantially greater than the number of bodily revolutions per second, through which the ring turns on its own center axis.

Now, to advance the ring 280 beyond the lowermost position ilustrated (FIGS. 23, 24 and 25), the servo-roller 282 must be advanced slightly beyond the lowermost position illustrated in FIGS. 23 and 24, as to the position indicated in the diagram of FIG. 25. In other words, the servo-roller 282 must climb a short distance up the track afforded by the inside bore 281 of the ring 280. The servo-roller 282 is of course carried by a crank arm turning about crank axis C. The eccentric bushing 292 makes provision for a variable distance between the crank axis and the axis of rotation S of the servo-roller 282. In effect, the check plates afford a crank arm extending from the crank axis C to the axis A of the pivot pin 291; and the eccentric bushing 292 affords, in effect, a drag link pivoted to such crank arm at pivot pin axis A and extending from axis A to the axis of rotation S of the servo-roller 282. The diagrams of FIGS. 24 and 25 illustrate the situation, FIG. 24 showing a begining position, or a position of zero power development, and FIG. 25 showing the device in normal operation, at which power is developed. The link CA is the effective crank arm of the eccentric bushing device of FIG. 23, having a length equal to the distance from the crank shaft axis C to the axis A of the pin 291. The drag link AS is in effect a link pivoted at A to crank arm CA and rotatably carrying the servo-roller at its trailing end on axis S, with the length of the drag link AS equal to the distance from axis A of pin 291 to the axis S of the servo-roller.

It will be seen that the effective drag link AS trails the effective crank arm CA; and that, as the crank is rotated, centrifugal force acting on the servo-roller 282 tends to force said roller outward, so as to bear against the inside of ring 280.

Also, as the roller 282 climbs slightly up the inclined track 281 inside the ring 280, the distance from C to the point of tangency, or contact, between roller 282 and the inside surface 281 of ring 280, is thereby shortened slightly. The angle between the line from C to A and the line from A to S then becomes smaller, this occuring by relative counterclockwise rotation of the eccentric bushing on the pin 291 (on axis A). The "drag-link" AS for the roller 282 thus decreases its angle relative to the effective crank arm CA. Thus the servo-roller advances up the incline of the ring track 281, and the centrifugal force of the roller against the ring 280, now applied forwardly of the original point of application (the extreme botom) forces the ring 280 to roll forwardly on the track 274 by a corresponding distance.

The parts thus advance from the position diagrammed in FIG. 24 to that diagrammed in FIG. 25. Referring to FIG. 24, the line of the centrifugal force $F_c$ exerted by the servo-roller 282 passes through the point of tangency or contact M between the ring 280 and the track 274. There is at this instant, and in this position, no force exerted by roller 282 tending to roll the ring 280 forward. In the instantly following position of FIG. 25, however, the servo-roller 282 has, as mentioned above, rolled a short distance forward, "up" the incline of the bore of the ring 280. The ring 280 has not yet advanced in the position illustrated in FIG. 25, and the parts have evidently been permitted to assume the position illustrated by reason of the pivot at A. Now, in this position of FIG. 25, the centrifugal force $F_c$ exerted by the servo-roller 282 on the inside of ring 280 acts at an angle $\theta$ to the line CM. M becomes the instantaneous center about which the ring can rock or roll forward; and the distance $\Delta$, the normal to the line of force $F_c$ drawn from the point M, is the lever arm length at which the force $F_c$ acts on the ring 280 to rock or roll it forwardly about the instantaneous center point M. Clearly, the greater the angle $\theta$ (which is the phase angle by which the servo-roller 282 is advanced beyond the ring 280), the greater the lever arm at which the force $F_c$ acts on the ring 280, and the greater the power that can be developed. The pivot axis at A in the crank mechanism carrying the servo-roller readily permits this phase angle $\theta$ to become large, and relatively large power to be developed. Some small phase angle $\theta$ could of course be devolped without a pivot point at A, owing to clearances and play in the parts, and for some low performance applications of an oscillator, the pivot point at A and the drag link (the eccentric bushing 292 in the case of the illustrative embodiment), can be omitted. However, for high power development, as required in a sonic pile driver, the pivot point and drag link arrangements are of great value.

The vibration generator as described has other novel features and advantages. Outstanding among these is the relatively low torque requirement in the crankshaft for development of relatively high power. It was mentioned above that the ring 280 rotates bodily, on its own axis, by rolling without substantial slippage on the inside of bushing 274. It was also mentioned that the number of such bodily revolutions per second is substantially less than the number of orbital trips which the ring 280 makes per second around the bushing 274, the frequency of the later being equal to crankshaft frequency. It will thus be evident that there is a large step down in frequency from the number of revolutions per second of the crankshaft to the number of bodily revolutions per second of the driven ring 280. The crankshaft, thus turning at substantially higher revolutions per second than the ring 280, does so at relatively low torque for the amount of power being transmitted. The crankshaft can therefore be of lighter structure and smaller bulk than would otherwise be required. The low torque at the crankshaft for the amount of power developed is one of the principal advantages of the oscillator.

Another advantage of the described oscillation generator over certain former generators, for example, over types having mechanically driven unbalanced rotors, resides in a "decoupling" of the unbalanced mass elements (the rings 280) from their driving mechanism. Thus, with the unbalanced rotor generator, there is an undesirable back reaction from the rotors to the driving mechanism as the oppositely turning rotors tend to decelerate during delivery of energy to the pile twice each cycle, and tend to accelerate during the intervening times while they are receiving energy from the power plant. Obviously there can be no such back reaction in the present generator, the rings 280 being mechanically decoupled from the driving crankshafts.

Figure 10:
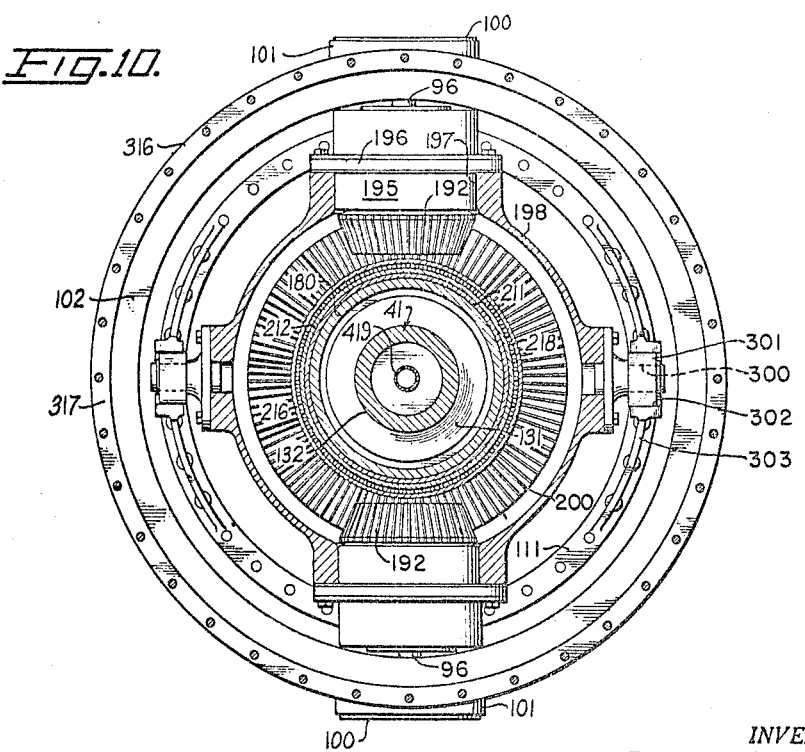
FIG. 10 is a section taken on broken line 10—10 of FIG. 6.
Figure 20:
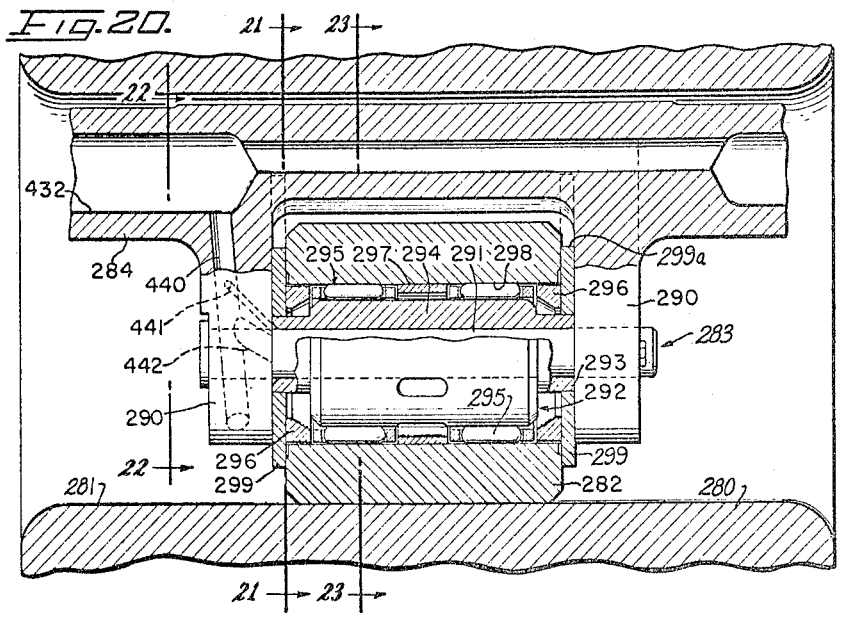
FIG. 20 is a sectional view taken in accordance with line 20—20 of FIG. 19, but with the crankshaft, servo roller and inertia ring angularly displaced 90° from the position of FIG. 19, i.e., with the crankshaft turning through its lowermost position.
Figure 21:
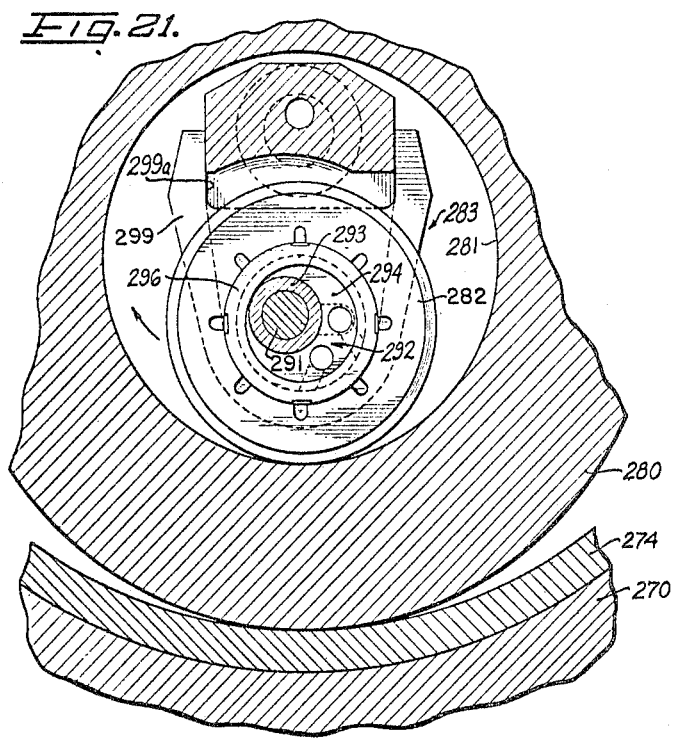
FIG. 21 is a section taken on line 21—21 of FIG. 20.
Figure 22:
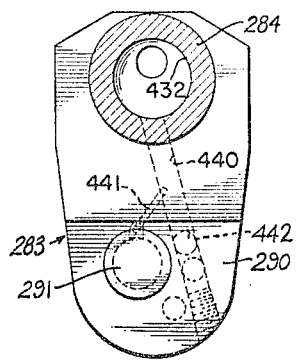
FIG. 22 is a section on line 22—22 of FIG. 20.

In the operation of the machine, the bevel gears 192 drive the ring gear 200, and the back reaction on the gears 192 is such as tends towards producing an unwanted rotation of the ring frame 198. To resist the torque so exerted on ring frame 198, the latter is furnished on diametrically opposite sides, midway between the bearings 194, with pins 300 pivotally mounting blocks 301 (FIGS. 8 and 10) which are received in vertical slots 302 in a pair of diametrically opposite frame brackets 303 extending upwardly from the rim of the supporting plate 111. The axis of the two pins 300 intersects the pivot center point T. The slots in the brackets 303 hold the blocks 301 to resist the torque on the ring frame 198.

In driving a pile into the ground, the pile tends commonly not to go straight down, but to tilt to some extent, owing to nonuniform composition of the soil, or to striking of boulders. It may also tend to rotate to some extent. The sonic pile driving machine of the invention accommodates for these deviations, and even takes advantage of and promotes the tendency for pile rotation.

In event of tilt of the pile from vertical, the column 41 clamped to the upper end of the pile, and supporting the oscillator, tilts correspondingly. The surrounding assembly of sleeve 180 and air spring housing undergoes the same tilt, as does ring frame 198, bearings 194, bevel gears 200 supported by the latter, and the oscillator drive gear driven from bevel gears 200 including the entirety of turret 224. This tilting action of these parts is permitted by sliding of arcuate bearing rings 174 and 176 on the arcuate part 171 of supporting plate 111, the relative sliding action of these arcuate parts taking place about center T as a pivot point. The reason for the channel shape of the support plate 111 will now be evident, in that this shaping accommodates the rocking action of the flange 181 above, and the air spring cover 143 below.

It will be seen that in this rocking or tilting action of the sleeve 180, flange 181, and ring frame 198 relative to the supporting plate 11-, the blocks 301 carried by the ring frame simply pivot in the slots 302 in the brackets 303 rising from the ring frame, thus accommodating for the relative pivotal action of the two groups of components involved.

It will also be seen, particularly from FIG. 7, that the arcuate splines of the ends at shafts 96 permit the bevel gears 192 to tilt through the necessary angle without interfering with the drive from shafts 86 and the engines. Plate 111 can, under these conditions, swing about the trunnion axis afforded by the collars 101 pivoted on the hubs or trunnions 76, though this trunnion axis primarily serves another purpose, as will be mentioned hereinafter.

It has been mentioned that the pile may tend to turn on its axis during driving, and this is deemed to be an advantage. The present machine has been so contrived as to promote or increase the tendency for twisting, since twisting of the pile during driving has the beneficial effect of decreasing friction between the pile and the earth. The reaction of the ring gear 221 driving the turret mounted gear trains is such as to exert a torque on the turret frame 232, and this torque causes the turret frame to rotate slowly on bearing bushings 235 and 240.

The turret frame is keyed to the oscillator body by means of two oscillator body wings 137a received in vertical slots 310 in brackets 311 (FIGS. 8 and 9) mounted on turret frame 232. Vertical bearing inserts 312 are preferably used in the bracket slots. The turret frame, rotating as described, thus acts through this keyed connection to rotate the oscillator body and with it the column 41 and the pile. The turret frame is thus rotatable relative to the ring frame 198 to cause slow rotation of the pile during driving, for example, but without limitation, six revolutions of the pile during complete driving of a pile.

The oscillator 42, turret 224, and associated parts, are covered by a bonnet 315 removably flange-connected at 316 to a ring 317 welded to the aforementioned ring 102. Below the housing wall 104 are housing sections 318, 319 and 320 (FIGS. 6 and 8), which are bolted to one another through abutting flanges, and the lowermost section 320 which engages and seals to the bottom of air spring bottom wall 147. Lubricating oil is maintained in the bottom housing h made up of these components, as to the level O, in FIG. 6, and is circulated by means of a pump 322 (FIG. 6) mounted on housing section 319. The pump 322 is driven from a sprocket 323 on sleeve 79 through a chain 324 and sprocket 325 on the shaft of the pump. The oil is maintained in the housing by the seal at 321, the seal supporting plate 321 being resiliently flexible, and moving with any motion of the air spring housing 154 to preserve the seal.

The lubricating oil pump 322 receives oil from the sump inside housing h via a hose 400, and discharges oil under pressure into hose 401 (FIGS. 6, 11 and 12). Hose 401 leads to adjustable pressure relief valve 402 (FIGS. 11 and 12) which has return line 403 to the housing h for oil discharged at excess pressure. The main discharge outlet from valve 402 is connected to filter 404 mounted on the side of housing section 319, and connects to hose 405 (FIGS. 11 and 12) leading to a fitting 406 mounted on the rim of air spring cover 143. Fitting 406 communicates with an oil passage 407 (FIG. 16) in cover 147 and extending up and through the tubular lower end supports a plate 321 carrying an oil seal element 321a portion 178 of sleeve 180 to discharge to the space adjacent bearing bushing 220, which it lubricates. This oil also rises through suitable oil grooves, not shown, to lubricate bushings 213 and 215, and various oil passages are indicated in the drawings, but need not be explained in detail, by which lubricant from this source provides lubrication for various bearings of the mechanism.

A fitting 410 (FIG. 12) mounted inside housing member 219, alongside fitting 156b, has an external connector 411 fed by a hose leading from a suitable source, not shown, of a mixture of oil and air under pressure. The air carries the lubricant in finely divided particles as a mist, and distributes it to bearing surfaces reached by the air. To fitting 410 is connected hose 414 leading to fitting 415 on the rim of air spring cover (FIGS. 12 and 17). A passage 416 in air spring cover 143 connects fitting 415 with an annular channel 417 encircling air spring head 126, between piston rings 145, and connected via passage 418 to the lower end of a tube 419 set into head 126, and rising therefrom, through stem 132, into a bore 420 in the bottom of oscillator base 136. The upper end of tube 419 is packed in bore 120, and communicates with oil passages 422 leading outward through opposite sides of the base part 136 of oscillator body 137.

Mounted over the openings of the passages 422 are boxes 424 (FIG. 18) having hollow arms 425 extending toward the axes of the two crankshafts 284, and coupled at 426, in any suitable fashion, to hollow arms 427 extending from caps 428 mounted on the end plates 276 on the sides of the oscillator housing opposite from the drive shafts 265. The arms 427 have bores 430 communicating with the hollow arms 425, and caps 428 have internal tubular projections 431 communicating with said bores 430 and with longitudinal bores 432 through crankshafts 284, the projections 431 being received and sealed within counterbores in the ends of the crankshafts, as shown in FIG. 18.

The oil mist supplied to the tube 419 is thus conveyed to the bores 432 in the crankshafts. Communicating with these bores 432 are cheek plate bores 440 which have branches 441 and 442 leading toward and supplying lubricating oil mist to the various bearing surfaces in the crank mechanism and servo-roller system. The details of these arrangements need not be explained, as they may vary at will, and are within the ordinary skill of the mechanical designer.

Referring again to the guiding of the sonic machine by the lead tubes 36, each of the latter is made up of a number of tube sections 36d having at the ends thereof engaging bolted-together coupling flanges 450. Welded on the sides of the tubing sections 36d facing toward one another are spaced parallel guide rails 452 which extend along the lengths of the tubing sections and which form guideways W for reception of vertically spaced guide blocks 453 and 454 (FIGS. 5 and 5a) projecting from the beam arms 75. Preferably, the upper and lower ends of the tubes 36 are closed by plates 450a, but the intermediate coupling flanges 450 afford communication between successive tube sections (FIG. 2), so that the tubes 36 can be filled with columns of water to add weight to the leads. The reason for this provision will appear presently.

In "hard going," it is sometimes desirable to add additional downward biasing force to the sonic machine. To this end, a cable system is provided, with connections at the top to the sonic machine, and with means (not shown) on the vehicle 30 for exerting tension in the cable. Two links 460 are connected at their upper ends to the frame arms 75, as at 461 (FIG. 5) and from there extend angularly downward and carry at their lower ends a horizontal tube 462. The tube 462 is in turn braced by struts 463, which carry slide blocks 464 received in the lead tube guideways W. The struts 463 are made rigid with the links 460. A cable 467 is connected to shaft 462, and extends downwardly, to pass under sheave 465 at the lower ends of the leads, and thence goes onto a power winch, not shown, within vehicle 30. It will be evident that the downward force which can thus be exerted on the sonic machine and pile is limited by the weight of the leads, since the cables, in passing under the lead mounted sheave 465, tend to elevate the leads. It is for this reason that provision is preferably made for weighting the leads by filling the tubes 36 with water.

The hydraulic clamping means for clamping the upper end of the pile will next be described.

The clamp cup 118 has a bore 500 adapted to receive loosely, or with some clearance, the upper end portion of a tubular steel pile P. Within this cup 118 is a ram 501 in the general shape of an inverted cup, the side walls of which are formed with a plurality of generally vertically disposed slots 502 having vertical sides 503 and downwardly and outwardly inclined bottom surfaces 504. Guided and partially contained within the slots 502 are wedge slips 505, having inclined rearward faces 506 slidable on the inclined slot surfaces 504. The front or outer sides of these wedge slips carry hardened, toothed inserts 507, which are adapted to make biting engagement with the inside of the upper end portion of the pile which has been inserted into the cup 118. A ring 508 mounted on the lower end of the ram 501 forms a ledge which catches and supports the slips 505 when there is no pile in the clamp. The upper ends of the slips 505 have outwardly projecting shoulders engageable by the end of the pile when the pile is introduced into the cup 118, and by which the slips are moved upwardly in the cup, as to the elevated position shown in FIG. 26. Upward movement of the ram under hydraulic pressure, as presently described, wedges the slips 505 outward with great force, and makes very secure clamping engagement with the upper end of the pile, actually slightly expanding the pile against the inside of the clamp cup 118.

Ram 501 is moved by a piston 510 in a cylinder 511 received inside the bore 512 of clamp cup 115. Cylinder 511 has an integral upper head 515, and a lower head 516, and the cylinder 511 and head 516 are secured to the bottom of cup 115, as shown.

Piston 510 has upwardly and downwardly extending axial sleeves 518 and 519, respectively, the former of which extends slidably through and is hydraulically sealed in a bore 520 in upper head 515, and the latter of which extends slidably through and is hydraulically sealed in a bore 521 in lower head 516. Sleeve 518 has bore 523 extending into piston 510 and terminating in bevelled shoulder 524, and seated on this shoulder 524 is the correspondingly bevelled shoulder 525 on the underside of a head 526 which is on the upper end of a tension rod 527. Tension rod 527 extends downwardly through reduced piston bore 528, sleeve 519, and through a bore 529 in the upper end wall 530 of ram 501. An arcuate bearing member 531 is threaded onto a threaded section 532 of rod 527, and engages an arcuate bearing surface 533 on the underside of wall 530. A jamb nut 534 is set up against bearing member 531.

To facilitate assembly, a means is provided for holding rod 527 against rotation while bearing member 531 and nut 534 are screwed thereon; and to this end, the head 526 of rod 527 is provided with a flat lug 535 engaging in a slotted plunger 536 splined inside sleeve 518, as at 537, and preferably yieldably urged downwardly by a spring 538, which assures take-up of slack.

The assembly as thus described assures good alignment of the various components of the clamp during operation, as will be evident.

Figure 26:
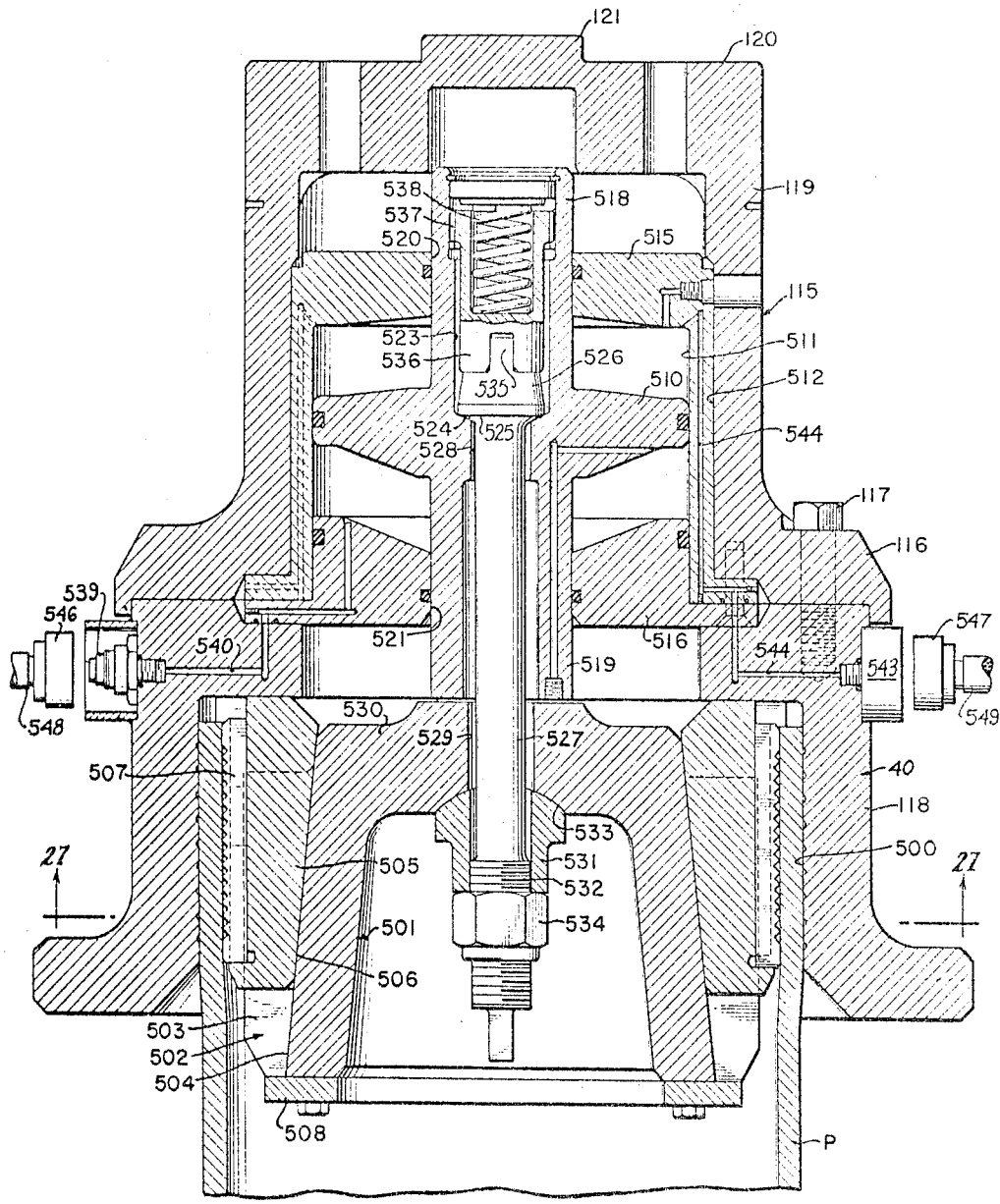
FIG. 26 is a longitudinal medial sectional view of the pile clamp, being a section on line 26—26 of FIG. 27.
Figure 27:
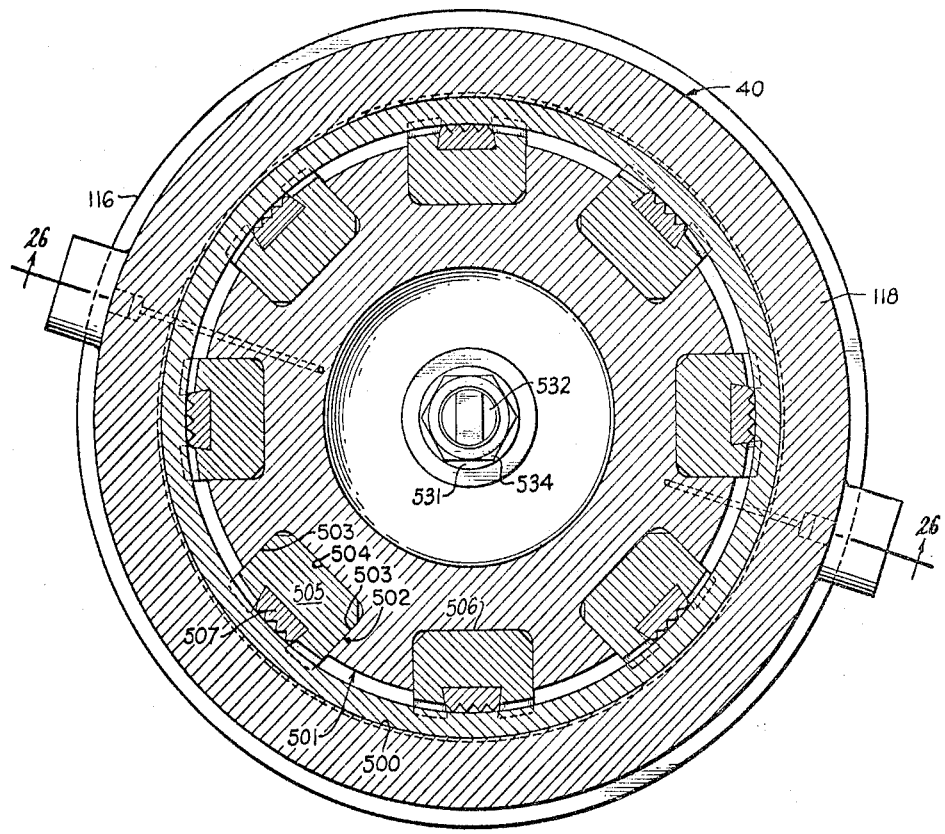
FIG. 27 is a transverse section on line 27—27 of FIG. 26.

Hydraulic liquid is fed to and exhausted from the cylinder chambers above and below the piston 510 for elevation and lowering of ram 501 by the following provisions. As shown in FIG. 26, a hydraulic fluid connector member 539 on the side of the top end portion of cup 118 communicates with fluid passage 540 opening into cylinder 511 below piston 510. A similar fluid connector member 543, shown located across from connector member 539, communicates with passageway 544 which opens into cylinder 511 above piston 510.

The two connector members 539 and 543 are of a well-known commerical type, such as "Wiggins" connectors. Associated with these connector members 539 and 543 are mating connector members 546 and 547 on the ends of hydraulic lines 548 and 549, respectively, line 548 being connected to a source of hydraulic liquid under pressure (not shown), and line 549 being a low pressure return line leading to a sump, not shown. To elevate the ram 501 to clamping position, pressure fluid connector member 546 is connected to connector member 539, and return line connector member 547 is connected to connector member 543. Hydraulic liquid under pressure then flows through passageway 540 to elevate piston 510 and the ram 501. To lower the ram and release the clamp, the connectors 546 and 547 are reversed in position, so that hydraulic liquid under pressure is fed to the chamber above piston 510, and exhausted from below the piston.

At the start of a pile driving operation, the pile to be driven is ordinarily, to begin with, resting in a horizontal position, at or about ground level. The entire sonic machine is lowered in the leads by the block and tackle gear 66 and the aforementioned power winch on the vehicle 30 until the pivot point T is approximately aligned with the end of the horizontal pile. The trunnioned part R of the machine, tiltable on the trunnions 76, is then swung up into a horizontal position, as shown in phantom lines in FIGS. 3 and 4. This is accomplished by means of a pair of telescopic pneumatic struts 550 of the cylinder and piston type. Cylinders 551 of these struts are pivotally connected at the top to overhead beam members 48, as at 552, and the piston rods 553 are pivotally connected, as at 554, to brackets 555 extending from housing cylinder wall 104, the pivot connection 554 being offset laterally from the axis of the trunnions 76, as will be clear from the drawings. Suitable pneumatic lines 556 and 557 (FIG. 5) and control valve means, not shown, will be understood to be provided for control and operations of the contractible struts so afforded, and it will be clear the contraction of this strut will swing the tiltable unit R to the phantom line position of FIGS. 3 and 4.

The pile P is then introduced into the clamp 40, and the latter is set, as heretofore described. The sonic machine is then elevated in the leads by the block and tackle gear 66, and the pile is dragged into a vertical position, the tilted unit R of the machine gradually swinging back into its normal vertical position. The vehicle 30, boom 33, and "spotter" 38 are manipulated to locate the pile at the point at which it is to be driven, and the pile is then lowered in the leads by block and tackle gear 66 until its lower end engages the ground. The engines are operated to drive the machine, and the block and tackle gear 66 relaxed by appropriate operation of the power winch to impose part or all of the weight of the sonic machine on the upper end of the pile. The engines drive the splined shafts 86 and 96, and through these shafts the bevel gears 192 and ring gear 200, which in turn drives bevel gears 222 of turret 224, and, through the gear trains in the two turret gear housings 250, the two oscillator drive shafts 265. Thereby, the orbiting rings 280 of the oscillator are driven, and, as described above, a vertically oscillatory force of reaction is experienced by the oscillator body 137, and applied therefrom, through the column 41, to the upper end of the pile. The engines are driven at a speed such that the frequency of this vertically oscillatory force is a resonant frequency of the pile P, taken together with that part of the vibratory mass of the sonic pile driving machine that is coupled thereto, so that a longitudinal standing wave is set up in the pile. The standing wave behavior of the pile is substantially as described in the aforementioned patent and need not here be repeated, the disclosure of said prior patent being incorporated herein by this reference.

The upper end of the pile, the column 41, inclusive of the air spring pistons 124, and the oscillator body 137, then participate in a vertical oscillation, the magnitude of which depends, of course, upon the scale of the equipment and the power developed by the oscillator.

Because of the arcuate splines at the ends of the oscillator drive shafts 265, these shafts have an angular vibration in step with the vertical oscillation of the oscillator body, but the vertical vibration is not transmitted in any material degree through these to the turret.

The weight of the portions of the sonic machine outside of the parts directly and positively mounted on the pile, i.e., the parts including the engines, framework, gear trains, etc., other than the hydraulic clamp, the column 41, inclusive of air spring pistons, and the oscillator body, are all supported on the air spring housing 154, and therefore are supported compliantly by the air under compression in the air spring chambers above the air spring pistons 124. The air spring pistons are therefore capable of oscillating vertically without transmission of material vibration to the air spring housing and parts of the sonic machine resting thereon, which are virtually isolated from the vibrating oscillator and pile. The pressures in the air spring are automatically regulated, as described hereinabove, for proper sustained compliant support of the parts resting on the air spring housing.

The machine accommodates itself to turning and tilting movement of the pile, as earlier described, and the drive means between the engines and pile include flexible drive elements, such, for example, as the several arcuately splined drive shafts, which facilitate such accommodations.

Under certain circumstances of extra hard going, it becomes desirable or necessary to increase the down loading or bias on the pile. This can be done by adding ballast to the sonic machine, or by pulling down on it through the cables 464, as earlier described.

For moderate driving effort, only one of the two engines need be used. Actually, single drive is ordinarily sufficient, and two-engine drive is required only for the heaviest type of work.

The sonic driving machine can also be used to pull a pile from the ground. In this case, the downward bias loading of the pile must be counteracted, and an upward bias exerted. This is accomplished simply by winding up on the hoisting cable 68 by means of the power winch for the latter in the vehicle 30. An upward force is thereby exerted through the cable 68 on the main supporting beam 46 of the machine and the parts of the machine suspended from said beam; and when the oscillator is driven under these conditions, the pile is elevated from the ground. The winch is of course driven during this operation to maintain the cable 68 taut and to wind up the cable as the pile is elevated. Also during this hoisting operation, the air spring 112 operates as it did during driving, but in the reverse direction, as required. That is to say, whenever the upward loading imposed on the air spring housing exceeds a predetermined value, the air spring housing elevates relative to the pistons 124, so that orifices 162 communicate wholly or partially with the chamber spaces above the pistons. A quantity of pressure air is thus discharged from above the pistons, so there is a pressure differential across each piston in the upward direction. A downward force then tends to be exerted on the air spring housing, so that the latter then tends to lower relative to the pistons. The system provides a regulated pressure differential across the pistons such as to maintain them compliantly in a centralized position in the air spring housing, as well as to permit oscillations of the pistons with the pile and oscillator, with the air spring housing and main parts of the machine fixed therewith virtually isolated from the vibration.

Having now described a complete form of the sonic pile driver, it would be well to consider some of the most important factors in the design and operation, as well as alternative designs better to accommodate these factors.

One very notable characteristic of the sonic pile driver is its responsiveness to horsepower. In other words, this particular form of sonic device is very susceptible to the power level, as regards performance. High power input gives very high performance of this machine, and this is not in direct proportion. In other words, above some certain threshold power level, depending upon the earthen formation, a doubling of the power input, for example, more than doubles the performance, by a considerable degree. Accordingly, it is desirable to follow whatever means is possible in order to get maximum power into the sonic pile. Therefore, in this connection, it is important to note that the power efficiency of the sonic oscillator is thus very important. In other words, it is not desirable to have a sonic oscillator which in itself is of too great mass. A great mass in the sonic oscillator construction will tend to move the antinode of the stress pattern up close to the oscillator, so that the oscillator itself is not moving with substantial stroke and consequent power input. Therefore it is desirable to have the oscillator body fairly lightweight. This of course then means that the oscillator must be a high efficiency device in order to develop substantial power.

Referring to this power concept, it is interesting to note that the roller-type oscillator described herein is especially effective because it has a high force output as a result of the centrifugal force effect of the massive roller orbiting around its race. Of equal importance, of course, is the fact that in order to handle a large amount of power there has to be a driving means which effectively drives this large roller.

In order to deliver substantial power to the large roller, it is usually desirable that the driving force apply its driving effort to the roller in as symmetrical a balance as possible. In other words, it is desirable to deliver the force to the roller in a manner which does not cause unbalance or unsymmetrical forces which tend to push the roller out of alignment as it rolls around its race. Accordingly it is desirable to push the roller by some means which delivers driving force at its centerline of mass. By this means it is possible to deliver maximized force to the roller, to cause it to roll around the race, without at the same time pushing it out of alignment so as to cause end friction in the guidance means which is intended to hold the roller in alignment on its race.

It accordingly follows, then, that one desirable design of this apparatus employs a driving means whereby the large roller is driven from a point within the roller itself. Referring to the above described embodiments it will be noted that there are many forms that this type of drive can take. However, in all instances it will be noted that the drive means is embodied within the roller itself.

In order for the drive means to be embodied within the roller, it is necessary that this drive means be designed for high-stress operation, and that, in fact, it be treated with every possible consideration, recognizing that there are necessarily very high stresses involved in this drive means which is crowded into the center of the roller.

In addition, I have discovered that the sonic pile driver as it goes down through the ground occasionally encounters hard objects such as rocks, etc., which tend to send sonic shock waves back up the pile. This is apparently due to the fact that the sonic energy coming down the pile has a high energy density where it meets such objects, so that the shock waves are generated at a very high energy level. Accordingly, the shock waves arrive up at the oscillator with considerable energy. These shock waves are carried through the moving roller on into the drive means within the roller as rotational impulses. Accordingly, I have discovered in driving sonic piling that there is considerable shock force delivered to this internal drive means in the roller.

This surprising discovery of the environmental stress applied to this internal roller drive has led to the discovery of the concept of the unique internal drive combination shown in various forms herein. In particular it will be noted that a flexible or elastic drive shaft is used between the engine source and the input to the oscillator drive. By flexible drive shaft, I am talking about a slender member as shown in numeral 265 which is capable of torsional compliance so as to relieve the shock stresses which apply to the internal mechanism of the roller as a result of the above mentioned shock waves coming up the pile. The flexible or torsionally elastic drive shaft allows this internal drive mechanism suddenly to change its angular position, without being subjected to reactive shock forces from the pile of trying to accelerate the engine rotation.

Accordingly it should be recognized that a very important contribution of this invention is the novel application of a drive shaft between the drive engine and the input to the oscillator.

There are additional novel and unexpected advantages to such a drive shaft, including the fact that it can be provided with a universal joint at each end, so that the above mentioned internal drive of the oscillator can be held by the oscillator body itself. The internal drive of the oscillator here is that portion which is mounted inside of the roller, as above described. The important point to recognize here is that this internal drive means being carried by the oscillator case is therefore held very accurately relative to the roller, so that high forces can thus be delivered to the roller by the described means. Therefore, it will be seen that there is considerable novel advantage in the universal joint drive shaft which makes possible the combination of the internally driven roller with its drive means mounted on the case thereof, in a sonic unit where the case itself is going through considerable acceleration forces. This novel feature is important of course only in a sonic pile driver where the accelerations are so very great.

The above described eccentric pin 292 for the servo roller has proven satisfactorily in a test model of the sonic pile driver. However, this design is somewhat sensitive to accuracy in manufacture because a number of bearing units have to be in perfect alignment simultaneously. This means that the main bearings 286 which carry the crank member must be in perfect alignment, the holes in the crank arm 290, which carry the eccentric pin, must be in perfect alignment with these main bearings, the eccentric pin 292 itself must be made with extreme accuracy, and the servo roller 282 must be very accurate as regards alignment and concentricity of its internal bore relative to its outer diameter. If all of these conditions are not met to an extremely accurate degree, very great loads are placed upon the needle or journal bearing 295 shown inside of the servo roller. In other words, the servo roller must bear its weight very uniformly upon the inside diameter of the main roller, otherwise there is considerable unbalance and excessive loading of some of the portions of the bearing within the servo roller.

Figure 28:
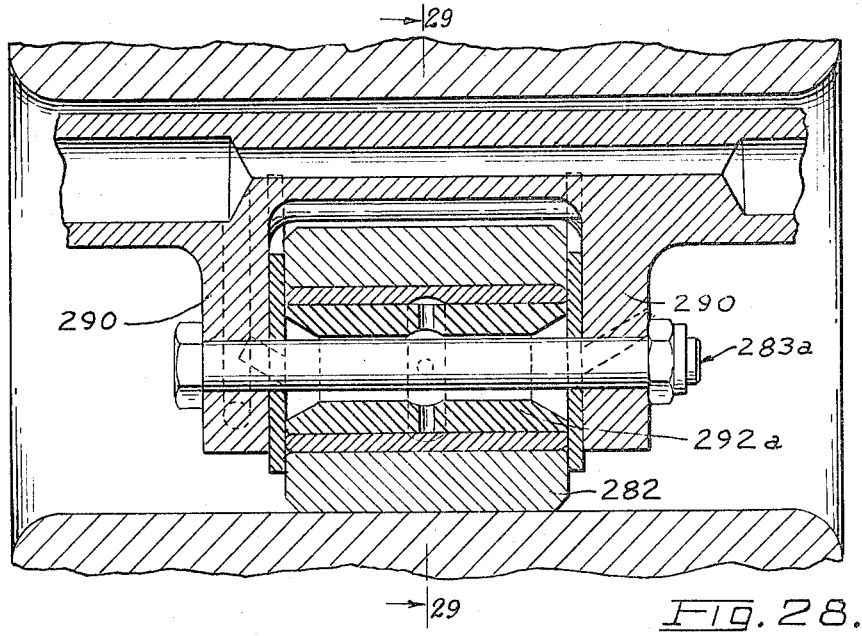
Figure 29:
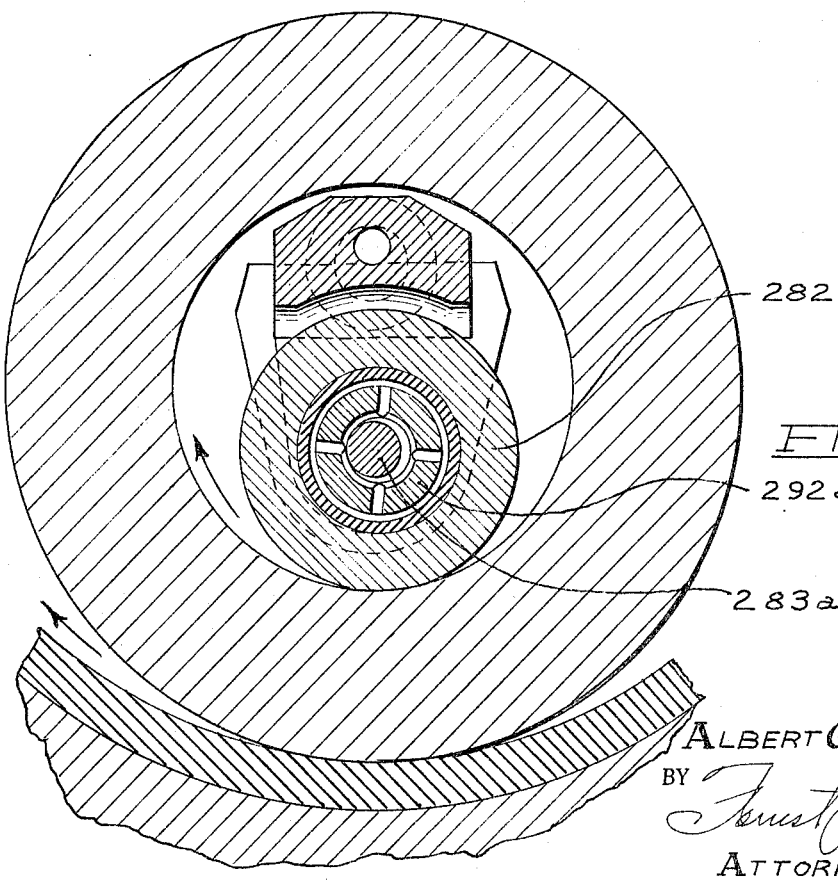

To alleviate the above problem we illustrate in FIGS. 28 and 29 an alternative configuration, also used in these sonic pile drivers, wherein the needle or journal bearing within the servo roller 282 turns on an axle 292a which has a fairly large hole bored therethrough. This axle is engaged by a smaller diameter pin 283a which is mounted between the cheeks 290 of the crank throw on the main crank. It can thus be seen that the looseness of the bore within the axle 292a, in relation to the diameter of its drive pin 283a, permits this axle to attain an optimum alignment with the drive pin. This greatly alleviates any tendency for unbalance on the bearing leads of the needle or journal bearings. These bearing means are a very critically loaded element in the total system because they operate at very high r.p.m., and they handle considerable force, under conditions where a heavy contrifugal field is trying to sling the oil out of the bearing system. In other words, only the outer needle bearings, or outer surface of the journal bearing, tend to get lubrication. Therefore this system is very sensitive to alignment, and the automatic alignment features of the loose drive pin within the bore in the drive axle greatly alleviates this problem.

In FIGS. 30 and 31 we see a form of this invention wherein the above described needle or journal bearing problem is eliminated entirely. In this variation the bearing is replaced by simple slipper 282a. This slipper slides around inside of the roller 280, in such a manner that only a simple journal bearing contact need be provided therebetween. In other words, this slipper bearing merely slides around on an oil film provided by an outlet hole 442a from crankshaft 284a, which outlet hole directs a layer of oil on the inside surface of the bore within the main roller 280. It will be noted that this slipper bearing 282a is shaped so that it has lesser mass at the forward edge, so as to have an inclined surface approach on the oil film. This wedge-type oil film then allows the slipper bearing always to ride up on top of the oil film very much like a sled runner. Because this slipper bearing is riding on a fairly substantial oil film, the dimensions of the total assembly are not so very critical because this oil film can accommodate for slight misalignment of the slipper bearing. In addition, of course, because of the substantial area of contact in this oil film, the loads of the slipper bearing are very low in pounds per square inch, as compared to the above mentioned needle or journal bearing.

It will be noted that in all forms of this invention the servo element, whether it be a roller or a slipper bearing, normally rides somewhat ahead of the contact point where the main roller meets the main race. This is due to the fact that the servo unit is applying power to the system. This then causes sudden torque shocks to be delivered to drive shaft 265 when shock impulses are transmitted to the main roller 280 as a result of these shock impulses being transmitted up the pile. The important point here is that crankshaft 284 (or 284a) can suddenly change its angular position so as to relieve the load on the servo device whether it be the slipper bearing or the roller. The reason the crankshaft can suddenly change its angular position is that there is elastic compliance in the small diameter shaft 265.

Further in regard to the major usage involving high power operation, it is important to note that under conditions of high torque drive the servo element orientation, such as described in connection with FIG. 25, assumes an extreme position high up on the inside of the main roller 280. This is because drive torque force is very much greater than centrifugal force of the servo element. Under this condition the radial freedom linkage reaches a somewhat minimal radius position and thus becomes rigid. The rotary drive thus becomes effectively "solid," with fixed angular phase relationship and consequent constant angular velocity for the main roller 280. This latter is a distinct advantage because a more constant angular velocity means a closer approch to the high efficiency of pure sine wave generation. Of course, here is where the torsional elasticity of the drive shaft 265 is a distinct advantage for eliminating the very extreme shocks, above described.

The drawings and description will be understood to be merely illustrative of one present embodiment of the invention, and it will further be understood that various changes in design, structure and arrangement may be made without departing from the spirit and scope of the appended claims.

I claim:
1. A vibratory pile drive comprising an oscillator for generating an alternating force in the direction in which a pile is to be driven, said oscillator having a power input shaft and a vibrating body, a coupling for coupling said vibrating body to the pile and a motor and transmission for driving said power input shaft, wherein a vibration absorbing support is provided which is connected to said vibrating body and which supports said motor and transmission, substantially isolating said motor and transmission from said alternating force, said transmission including an output coupling shaft which is substantially perpendicular to the direction in which the pile is to be driven, which is axially aligned with said power input shaft and which has universal joint couplings at its opposite ends, and which oscillator has a large roller orbiting around a bearing race in said vibrating body, and which power input shaft is arranged to deliver drive force within a coaxial bore in said massive roller.

2. The apparatus of claim 1 wherein said power input shaft drives a smaller roller which rolls inside of said bore in said massive roller.

3. The apparatus of claim 2 in which said smaller roller is connected to said input shaft by means of a drive connection having radial freedom of position.

4. The apparatus of claim 1 wherein said power input shaft drives said massive roller by means of a slipper pad bearing which slides inside of said bore in said main roller.

5. The apparatus of claim 4 wherein said slipper pad is connected to said power input shaft with a drive connection means having radial freedom of position.

References Cited by the Examiner
UNITED STATES PATENTS

| | | | |
|---|---|---|---|
| 2,204,472 | 6/1940 | Caguot | 74—87 X |
| 2,897,734 | 9/1959 | Bodine | 175—55 X |
| 3,036,471 | 5/1962 | Peterson | 74—87 |
| 3,189,106 | 6/1965 | Bodine | 175—55 X |

CHARLES E. O'CONNELL, *Primary Examiner.*

R. E. FAVREAU, *Assistant Examiner.*